US010765072B2

(12) United States Patent
Lovelace et al.

(10) Patent No.: US 10,765,072 B2
(45) Date of Patent: *Sep. 8, 2020

(54) METHOD OF ACCELERATING THE GROWTH AND DEVELOPMENT OF TREES AND SHRUBS VIA ENHANCED ROOT DEVELOPMENT

(71) Applicant: Wayne Lovelace & Judy Lovelace, Elsberry, MO (US)

(72) Inventors: Wayne Lovelace, Elsberry, MO (US); Hugh Steavenson, Elsberry, MO (US); Bob Suddarth, Elsberry, MO (US)

(73) Assignee: WAYNE LOVELACE & JUDY LOVELACE, Elsberry, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,624

(22) Filed: Aug. 4, 2017

(65) Prior Publication Data

US 2017/0325412 A1  Nov. 16, 2017

Related U.S. Application Data

(60) Continuation of application No. 14/599,819, filed on Jan. 19, 2015, now Pat. No. 9,723,796, which is a continuation of application No. 13/913,226, filed on Jun. 7, 2013, now Pat. No. 8,936,788, which is a continuation of application No. 13/568,056, filed on Aug. 6, 2012, now Pat. No. 8,460,677, which is a division of application No. 11/731,997, filed on Apr. 2, 2007, now Pat. No. 8,236,322, which is a division of application No. 10/216,092, filed on Aug. 9, 2002, now Pat. No. 7,308,775.

(60) Provisional application No. 60/312,593, filed on Aug. 15, 2001.

(51) Int. Cl.
*A01G 9/029* (2018.01)
*A01G 23/00* (2006.01)
*A01G 9/02* (2018.01)
*A01G 9/00* (2018.01)

(52) U.S. Cl.
CPC .............. *A01G 23/00* (2013.01); *A01G 9/028* (2013.01); *A01G 9/029* (2018.02); *A01G 9/00* (2013.01)

(58) Field of Classification Search
CPC ...................................................... A61K 36/00
See application file for complete search history.

(56) References Cited

U.S. PATENT DOCUMENTS

| 4,067,716 A | 1/1978 | Sterrett |
| 4,622,775 A * | 11/1986 | Glenn et al. ............. 47/63 |
| 4,662,775 A | 5/1987 | Faul |
| 6,293,047 B1 | 9/2001 | Acey |
| 6,357,180 B1 | 3/2002 | Huang |
| 6,479,433 B1 | 11/2002 | Hann et al. |
| 2003/0089035 A1 | 5/2003 | Courtemanche |

FOREIGN PATENT DOCUMENTS

| JP | 11-131480 | 5/1999 |
| JP | 2000-201539 | 7/2000 |
| JP | 2002-165520 | 6/2002 |
| WO | 0100543 | 4/2001 |

OTHER PUBLICATIONS

Harris et al, Root pruning pin oak liners affects growth and root morphology. HortTechnology (2001), vol. 11, No. 1, pp. 49-52.*
International European Search Report dated Aug. 28, 2012, 3 pages.
Einert et al., "Rice hulls and hull compost in growing media for container-grown junipers", Arkansas Farm Research (1975) 24 (3): 2.
Omon, "The effect of some mycorrhizal fungi and media on the growth of Shorea leprosula Miq. Cuttings, Pengaruh beberapa jamur mikorize dan media terhadap pertumbuhan stek Shorea leprosula Miq, Buletin Penelitian Hutan", (1996) No. 603, pp. 27-36. 10 ref.
Tilt et al., "Physical Properties of Propagation media and their effects on rooting of three woody ornamental", HortScience 22 (2): 245-247, 1987.
International Search Report, dated Jun. 13, 2008, 2 pgs.
Written Opinion of the International Searching Authority, dated Jun. 13, 2008, 5 pgs.
Dey et al., "Production and Early Field Performance of RPM® Seedlings In Missouri Floodplains", Proceedings of the 6th Walnut Council Research Symposium, 2004, 14 pgs.
Shillinglaw et al., Seed Germination "Tricks of the Trade" From Prairie Nursery, Mar. 23, 2007, 5 pgs.
"Sooner Plant Farm", Aug. 25, 2007, 10 pgs.
Walker, "Development and Construction of an Air-pruning Propagation bench, and its Proper Use", Sep. 17, 2006, 7 pgs.
St . Louis Post Dispatch business Plus, "From the Roots Up", May 29, 2000, p. 10-11.
Columbia Daily Tribune, "Growing with the Flow", May 21, 2000, p. 1-6.
SNA Research Conference, "Effects of Air-Pruning on Cutting and Seedling Growth in Container Tree Propagation", 1987, pp. 134-139.
Planning, Rehabilitation and Treatment of Disturbed Lands Billings Symposium, "Propagating Containerized Oak and Nut Tree Seedlings for Use on Drastically Disturbed Lands", 1996, pp. 1-3.
The International Plant Propagators Society, "The Root Producing Method (RPM) System for Producing Container Trees", 1998, vol. 48, pp. 556-557.
Harris et al., "Root pruning pin oak liners affects growth and root morphology", HortTechnology, Jan./Mar. 2001, vol. 11, No. 1. p. 49-52.
Godoy et al., "Avaliação de substratos alternativos para a produção de mudas de tomateiro," Resumos de V CBA—Manejo de Agroecossistemas Sustentáveis, vol. 2, No. 2, pp. 1127-1130 (2007). Title in English "Alternative substrates evaluation for the production of tomato seedlings".

(Continued)

*Primary Examiner* — Qiuwen Mi
(74) *Attorney, Agent, or Firm* — Merchant & Gould

(57) ABSTRACT

A method and container for developing seedlings includes germinating the seeds and air pruning the seedlings to a depth of about 3 inches.

20 Claims, 37 Drawing Sheets

(56) References Cited

OTHER PUBLICATIONS

Khan et al., "Effect of seed weight, light regime and substratum microsite on germination and seedling growth of Quercus semiserrata Roxb," Tropical Ecology, vol. 42, No. 1, pp. 117-125 (2001).
Phillips, "Elevation, on- or off-tree collection influence the viability of blue oak acorns," California Agriculture, vol. 46, No. 5, pp. 30-32 (Sep.-Oct. 1992).
Shaw, "Factors Affecting the Natural Regeneration of Sessile Oak (Quercus Petraea) in North Wales: II. Acorn Losses and Germination Under Field Conditions," Journal of Ecology, vol. 56, No. 3, pp. 647-660 (Nov. 1968).

* cited by examiner

METHOD OF ACCELERATING THE GROWTH AND DEVELOPMENT OF TREES AND SHRUBS VIA ENHANCED ROOT DEVELOPMENT

CROSS-REFERENCE TO RELATED APPLICATIONS

The present application is a continuation of U.S. patent application Ser. No. 14/599,819, filed Jan. 19, 2015, now U.S. Pat. No. 9,723,796, which is a continuation of U.S. patent application Ser. No. 13/913,226, filed Jun. 7, 2013, now U.S. Pat. No. 8,936,788, which is a continuation of U.S. patent application Ser. No. 13/568,056, filed Aug. 6, 2012, now U.S. Pat. No. 8,460,677, which is a divisional of U.S. patent application Ser. No. 11/731,997, filed on Apr. 2, 2007, now U.S. Pat. No. 8,236,322, and which is a divisional of Ser. No. 10/216,092, filed Aug. 9, 2002, now U.S. Pat. No. 7,308,775, and which claims priority from U.S. provisional patent application No. 60/312,593, filed Aug. 15, 2001, each of which are incorporated herein by reference in their entireties.

BACKGROUND OF THE INVENTION

Field of the Invention

There is an ever-increasing demand for native hardwoods, but commercial farming of this class of trees is frustrated by the slow growth of this class of trees and the difficulty in transplanting them. Similarly, non-commercial reforestation with hardwoods is frustrated by the slow growth and transplantation difficulties. "Traditional" production methods for native hardwoods such as Oaks, Hickories, Ash, Nut trees and others are notoriously slow growing and tend to develop a coarse, carrot-like dominant tap root which makes them very difficult to transplant both in the nursery and especially in out-planting situations—where mortality rates often ran as high as 70 percent or more.

To try and overcome the problems associated with transplantability of native hardwoods and other difficult to transplant species, many nurseries began to "root-prune" their plants while in the field one to three years prior to sale in hopes of developing a "secondary" root system which would give this class of plants a better chance of surviving the out-planting process. The major problem associated with root-pruning in the field is that it not only "shocks" the plants because its root system has been severed but also halts growth and forces the grower to "wait" for another year or more for the root system to re-develop. Although the process of root pruning in the field greatly helped to minimize loss after out-planting, the process was slow, costly and extended the time a plant must remain in the nursery.

One prior art method of root pruning is disclosed in Huang and Liang, Effects of Air-Pruning on Cutting and Seeding Growth in Container Tree Propagation, SNA Research Conference 1987, incorporated herein by reference, pages 134-137.

SUMMARY OF THE INVENTION

This inventions relates to a method of accelerating the growth and development of trees via an enhanced root system. Generally, the method of this invention comprises: Selecting seed of the species to be grown from trees from the same climate, and preferably the same growing conditions. Sorting the seed is based upon density, size, and/or weight. Placing the seed on the surface of a growing medium. Subjecting the seed to cold stratification in sufficient time to maximize the growing season (time of last frost to time of first frost) upon subsequent transfer outside. Transferring the cold-stratified seed to a greenhouse to being germination is about 30 days, subjecting the seedling to air root pruning at a depth of about 3 inches. Sorting the seedling according to height and caliper, and transplanting the seedling to bottomless bands/pots. Growing the seedling in bottomless bands while subjecting the seedling to a further air root pruning at a depth of about 4¼ inches. Hardening of the seedling off, and transplanting the seedling for further growth outside as close to the beginning of the growing season as possible to maximize the growing season and growth potential.

The general method of this invention, without the specific details of the invention described and claimed herein, is disclosed in Lovelace, The Root Production Method (RPM) System for Producing Container Trees, The International Plant Propagators' Society Combined Proceedings, Vol. 48 (1998), incorporated herein by reference.

DETAILED DESCRIPTION OF THE INVENTION

The method of the present invention involves consideration of seed selection, including seed origin (provenance, density, and size). It further involves consideration of seed handling including stratification, timing of germination to extend growing season, technique (depth) of seeding. It further involves air pruning, preferably in two steps using air as a means of root pruning to enhance the development of a dense fibrous root mass. It further involves gradation for uniformity of stock and to reduce transplanting losses. Lastly, the method involves selection of growing media, including fertilizer, consideration of air space, wetting agents, and components. The method of the present invention accelerates rate of growth, and induces early flowering and fruiting.

Seed selection is an important component in the acceleration of tree growth. Special attention is provided to assure seed is selected from superior individual parents, showing outstanding phenotype, typical of the particular specie or variety of tree. Attention also must be focused on the climate zone of origin, including attitude and locations within its native geographical range, normally referred to as "provenance". Within a given provenance, seed is selected based on environmental conditions of the final location. It is desirable to select seed from the same species growing in the same environmental conditions, e.g., a flood plain or an upland site. Seed is collected site specific. These different types of seed are referred to as ecotypes. Proper selection results in tree improvement, superior adaption to planting sites all of which add to economic and aesthetic value.

Seed handling is also an important component in the acceleration of tree growth. Collected seed are processed by cleaning out any foreign materials. They are then processed through an aspirator to separate out the heaviest individual seed. Density is the most important factor in germination capacity of any seed, and survival of the seedling. Density is a measure of the stored food reserve. After the heaviest seed are selected they are then processed through a sieve which grades them by size, e.g. three (3) or four (4) different sizes. Only the largest, heaviest seed are used. Since these factors (weight, size, and density) are genetic in nature these processes have definite effects on the genetic improvement of the progeny.

Figure 5:
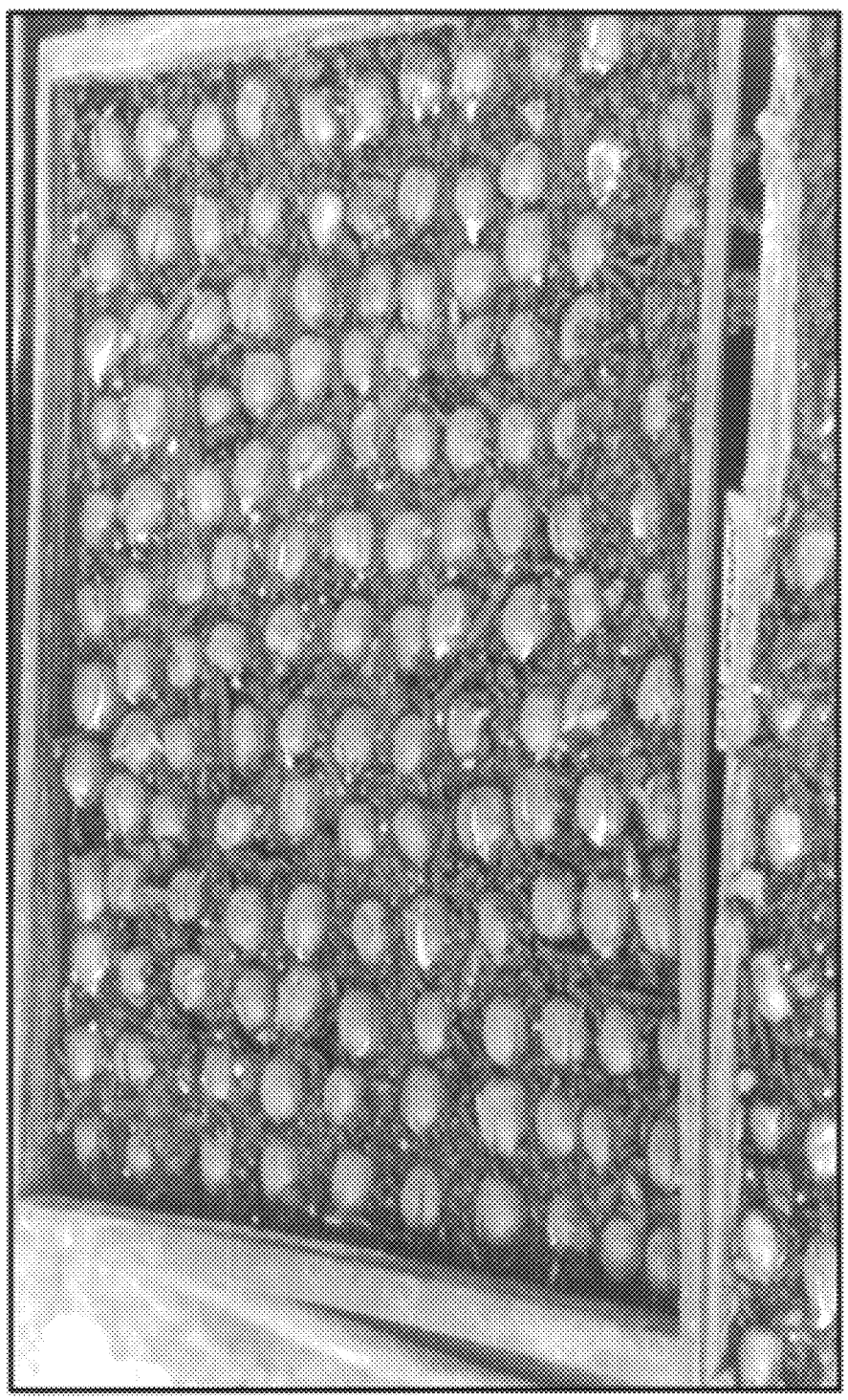
FIG. 5 is a photograph of seed of *Quercus bicolor* shown on the surface of growing media in preparation for cold stratification.
Figure 6:
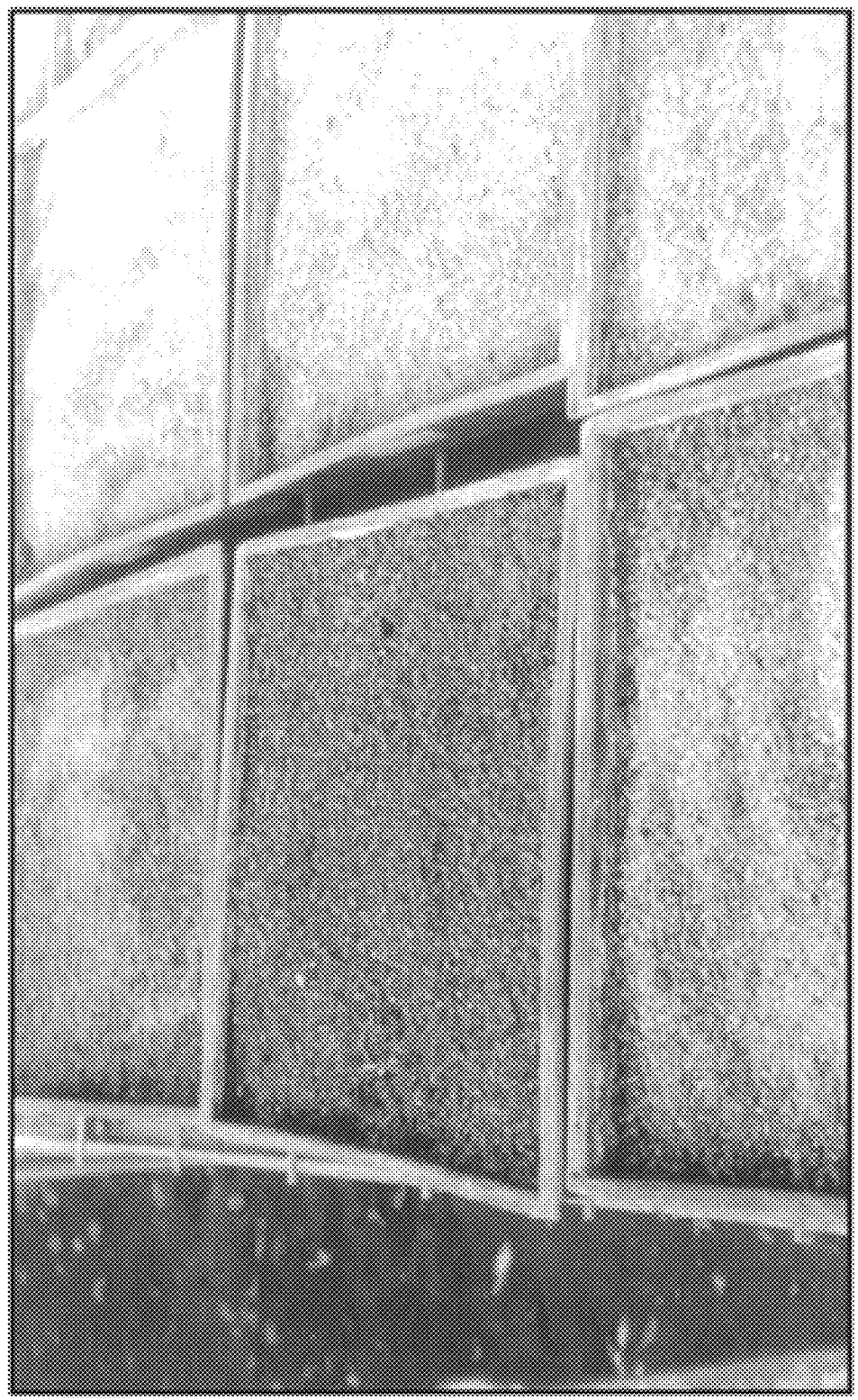
FIG. 6 is a photograph of seeds of other species shown on the surface of growing media in preparation for cold stratification.
Figure 7:
FIG. 7 is a photograph of stacks of flats of seeds ready for cold stratification.
Figure 8:
FIG. 8 is a photograph showing stacks of flats of seeds in cold stratification.
Figure 9:
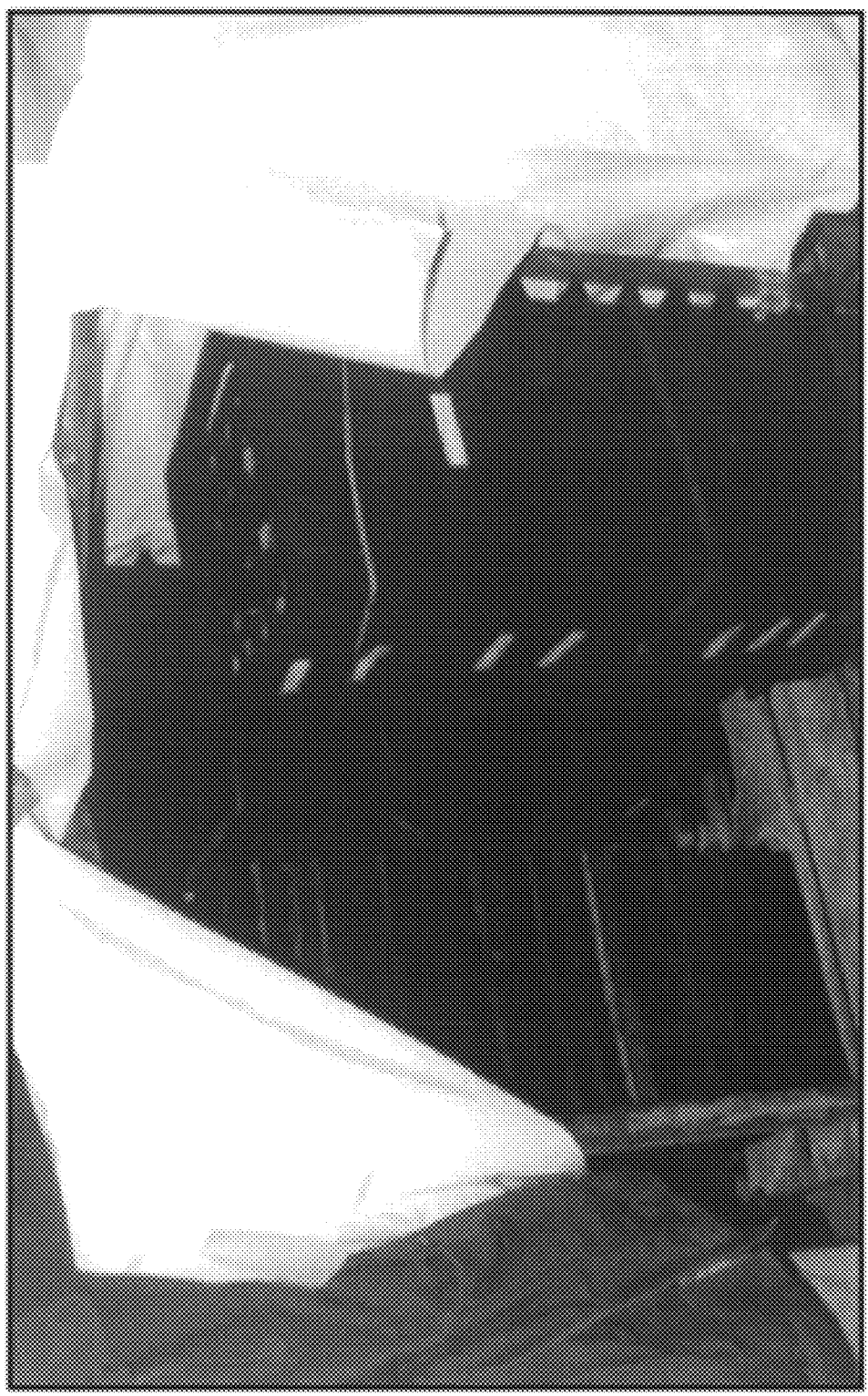
FIG. 9 is a photograph showing stacks of flats of seeds in cold stratification.

Seed stratification and timing are also important in the acceleration of tree growth. The length of time required for stratification is predetermined so germination can start (For example February 1st.) Thus the seed must be handled in such a manor that all stratification requirements are satisfied prior to February 1st. Thus, for example, a seed requiring ninety (90) days of cold stratification would have to be placed in our cold storage November 1st, so that it could be germinated by February 1st. As shown in FIGS. 5 and 6, the seed is preferably pre-sown in the stratification media (which is preferably the same as growing medium, described below) and as shown in FIGS. 7, 8 and 9, the seeded trays are stacked in a cold storage room where temperature is maintained at 32 F°. The seed are placed on the surface of the growing medium. When germination begins, the outer seed coat splits exposing the seed cotyledons. When exposed to light the cotyledons turn from their normal pure white to green, indicating they are photosynthesizing and producing additional energy for the germinating seedling. The inventors' research shows that most of the energy produced by the seed's cotyledons goes to the production of the plants root system, thus adding to the primary goal of producing and enhancing an improved root system. This is in contrast to the established conventional rule that the depth of seed planting should be twice the diameter of the seed. The 32 F.° temperature will prevent pre-germination of seed once its ripening requirements have been satisfied. This 32 F.° temperature is also in contrast to the established convention wisdom of temperatures between about 37 F.° to 41 F°. Still another difference from conventional methods is placing the seeds in growing media. Historically seeds have been stratified separately and then seeded immediately prior to germinating.

Figure 10:
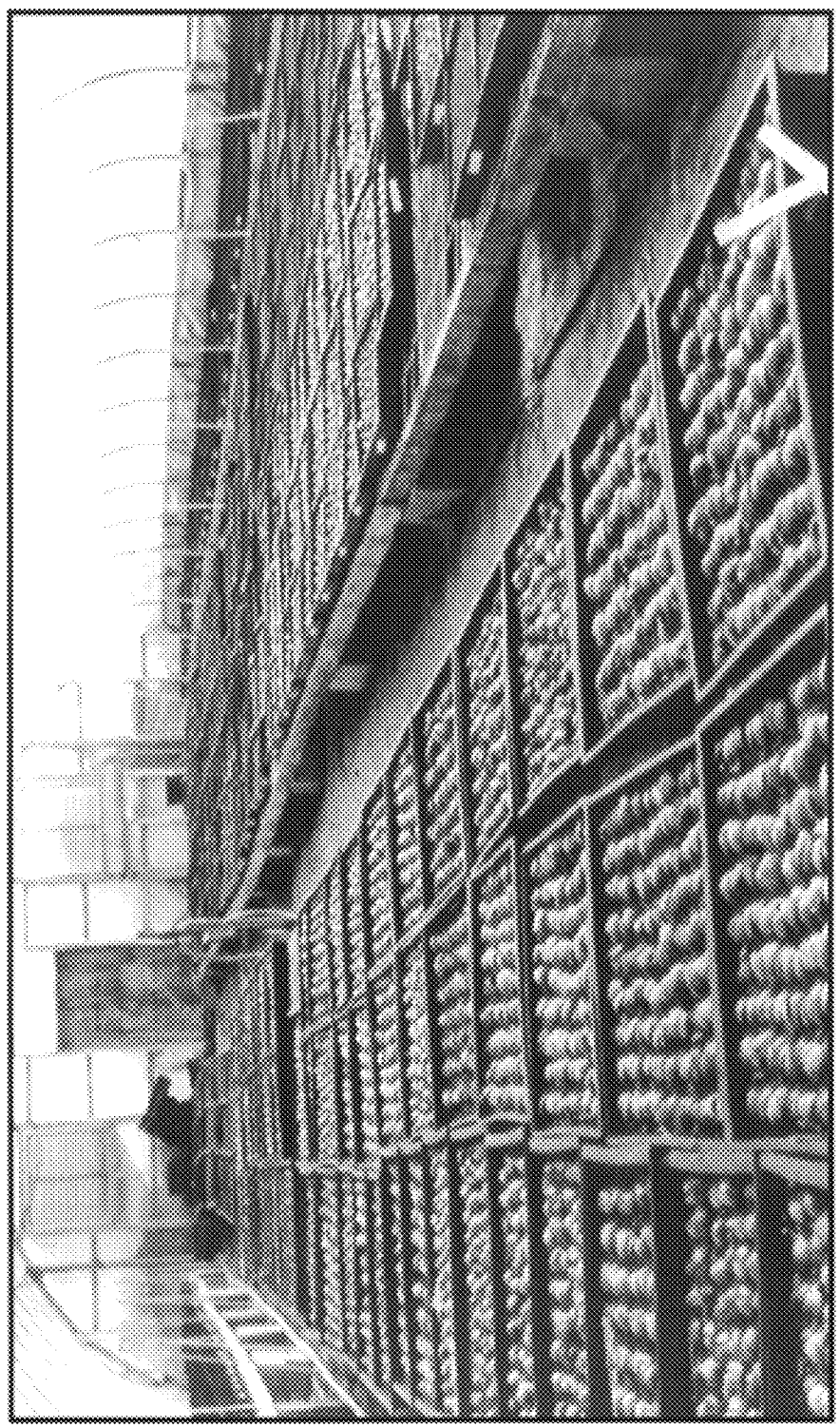
FIG. 10 is photograph showing flats after stratification, placed in a greenhouse on bottomless benches for germination.
Figure 30:
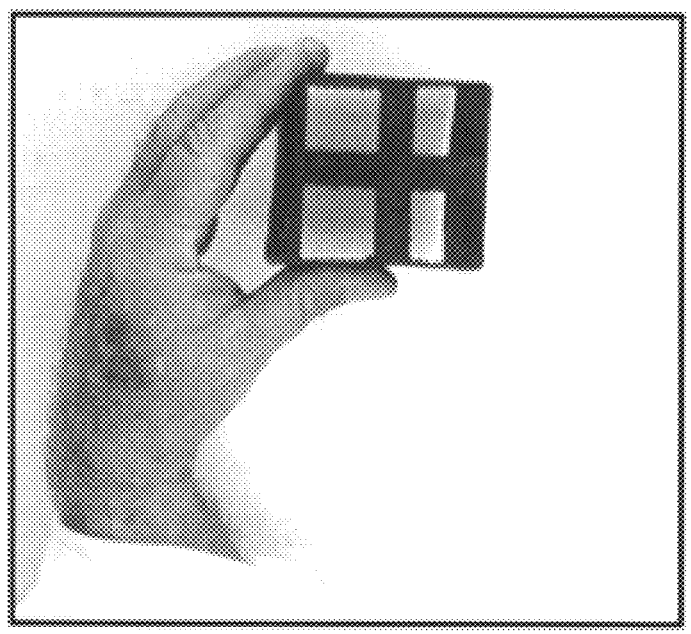
FIG. 30 is a photograph of a bottomless pot measuring 3 9/16 in.×3 9/16 in.×4¼ in. deep used in Step 1.

The timing of the above steps in the method is based on having the seedlings processed through termination, Step I root pruning, grading, and Step II transplanting, so they are ready for planting outdoors by the frost free date (approximately May 10 in Missouri). This gives the seedlings the maximum growing period until the first fall frost, approximately 210 growing days. A time sequence might be: February 1st—start germination in greenhouse at a temperature of between 68 F.° and 72 F.° for about thirty days, as shown in FIG. 10. March 1st transplant to square deep bottomless containers for additional air pruning of the lateral roots produced in the seed flat pruning. Containers 2¾× 2¾×3 inch have been used satisfactorily for this step, but the inventors have determined that containers 3 9/16×3 9/16×4¼ inch produce superior plants as shown in FIG. 30. At the end of Step II, the seedlings are between 12 inches and 18 inches in height and are ready to be planted in their final growing container outside in a nursery production area.

Figure 1:
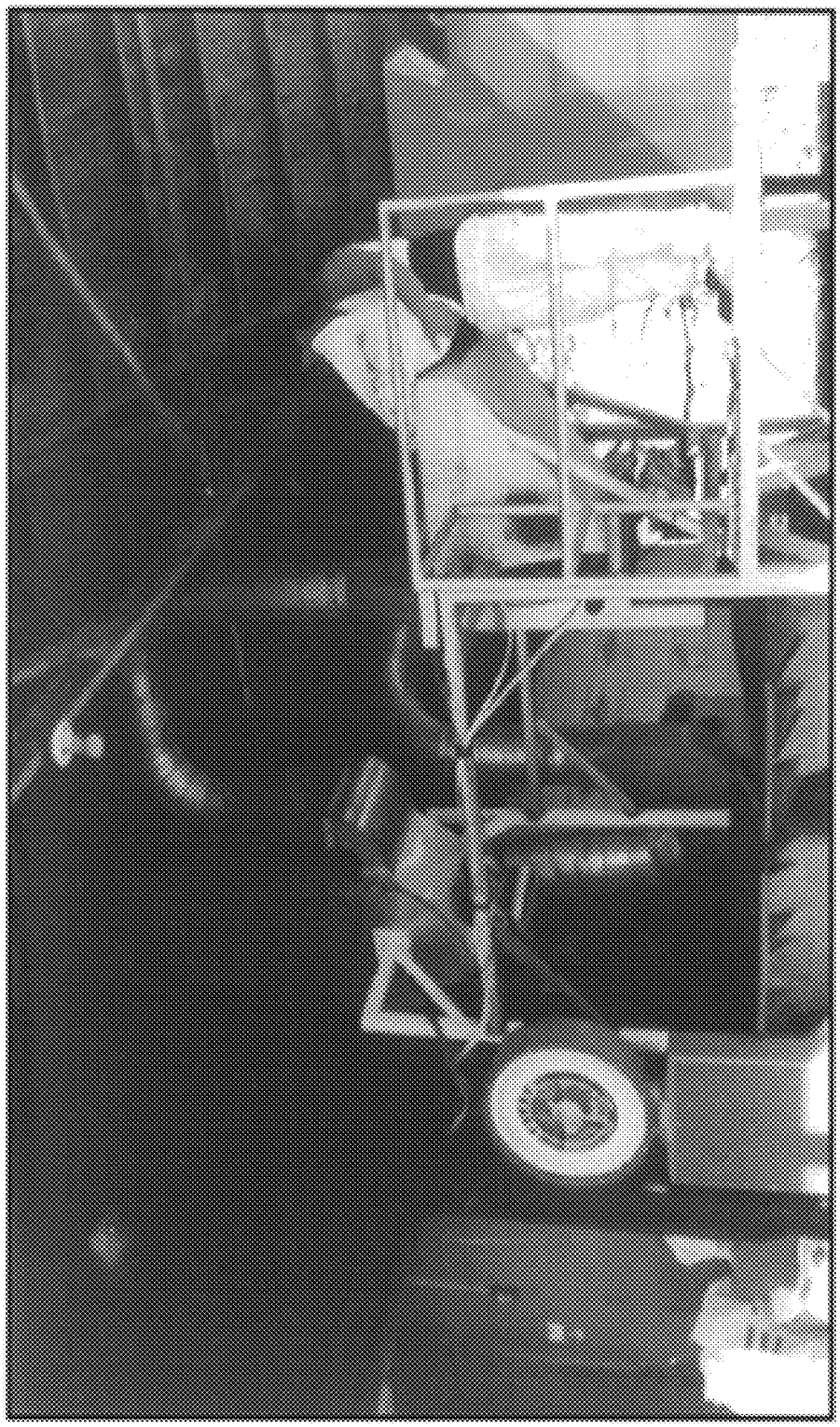
FIG. 1 is a photograph illustrating the grading of seed by density using a Jesse Aspirator.
Figure 2:
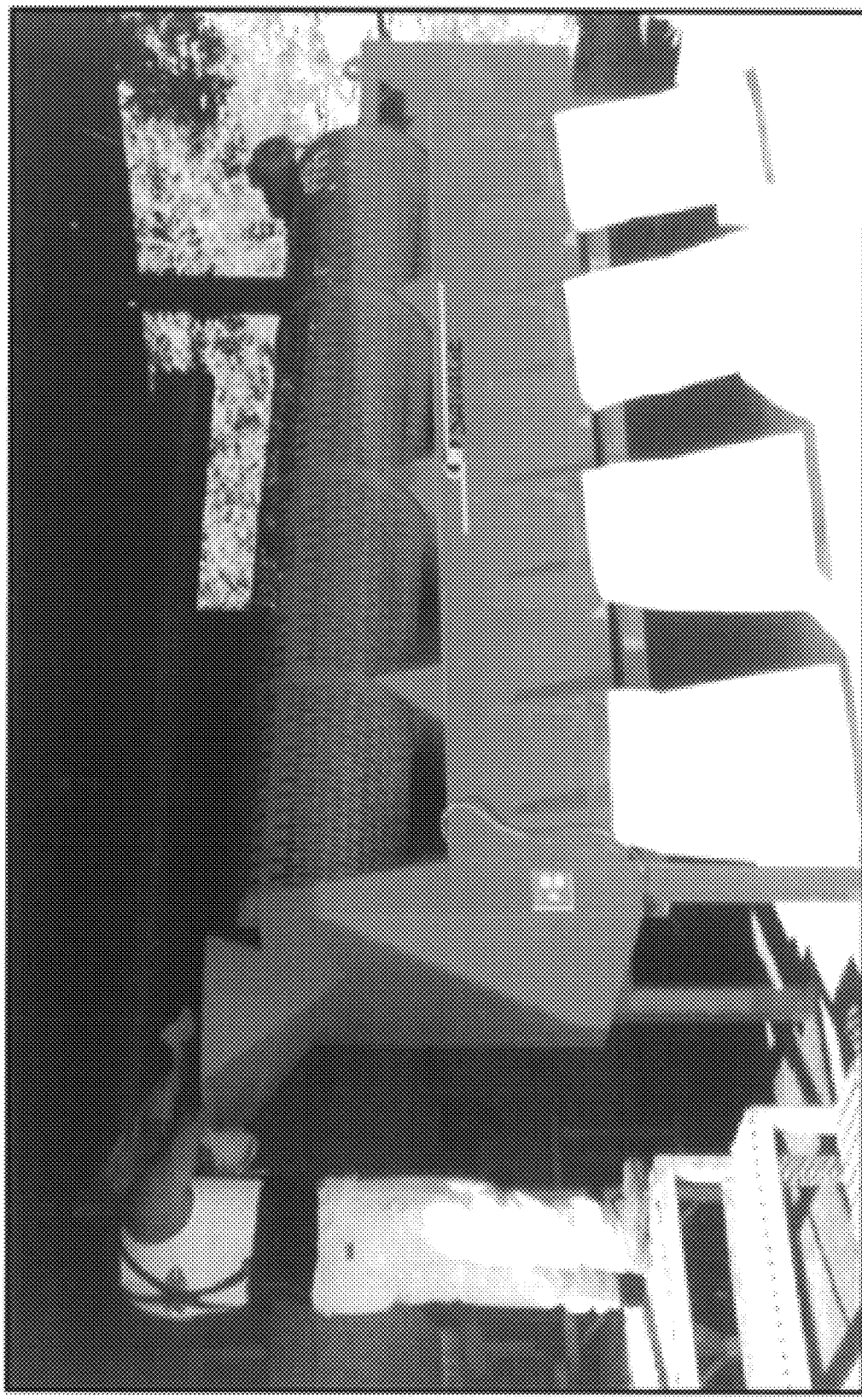
FIG. 2 is a photograph illustrating the grading of seed by weight and size using a Savage Sizer and an Oliver Gravity Table for smaller seed.
Figure 3:
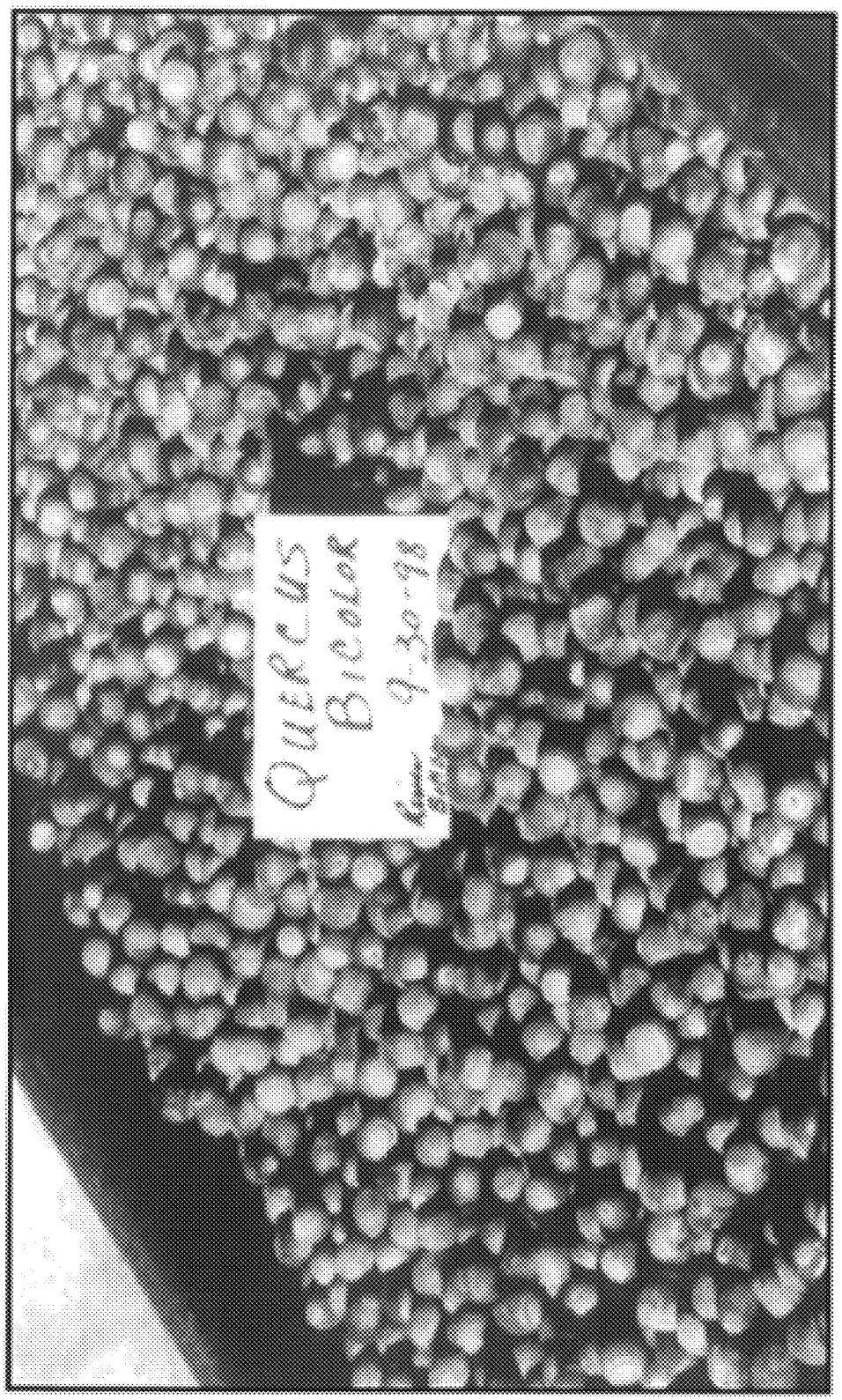
FIG. 3 is a photograph showing graded seed of *Quercus bicolor*. Swamp White Oak F2 Orchard—large seed 76 per pound, medium seed 100 per pound and small seed 142 per pound. Swamp White Oak F2 Orchard (Special Tree #6) 64 per pound.
Figure 4:
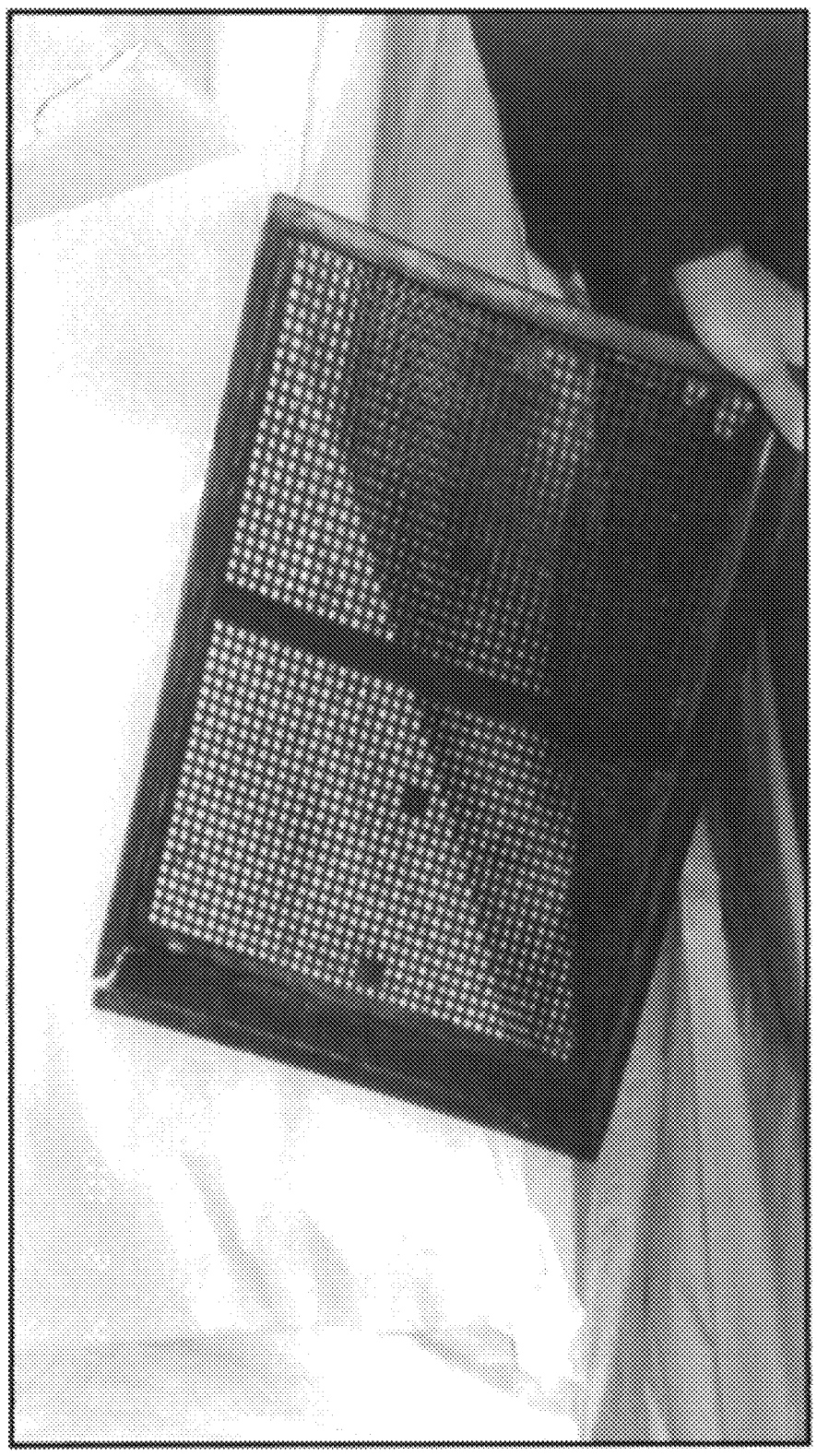
FIG. 4 is a photograph illustrating the bottomless flats used for air pruning in accordance with the principles of this invention.
Figure 23:
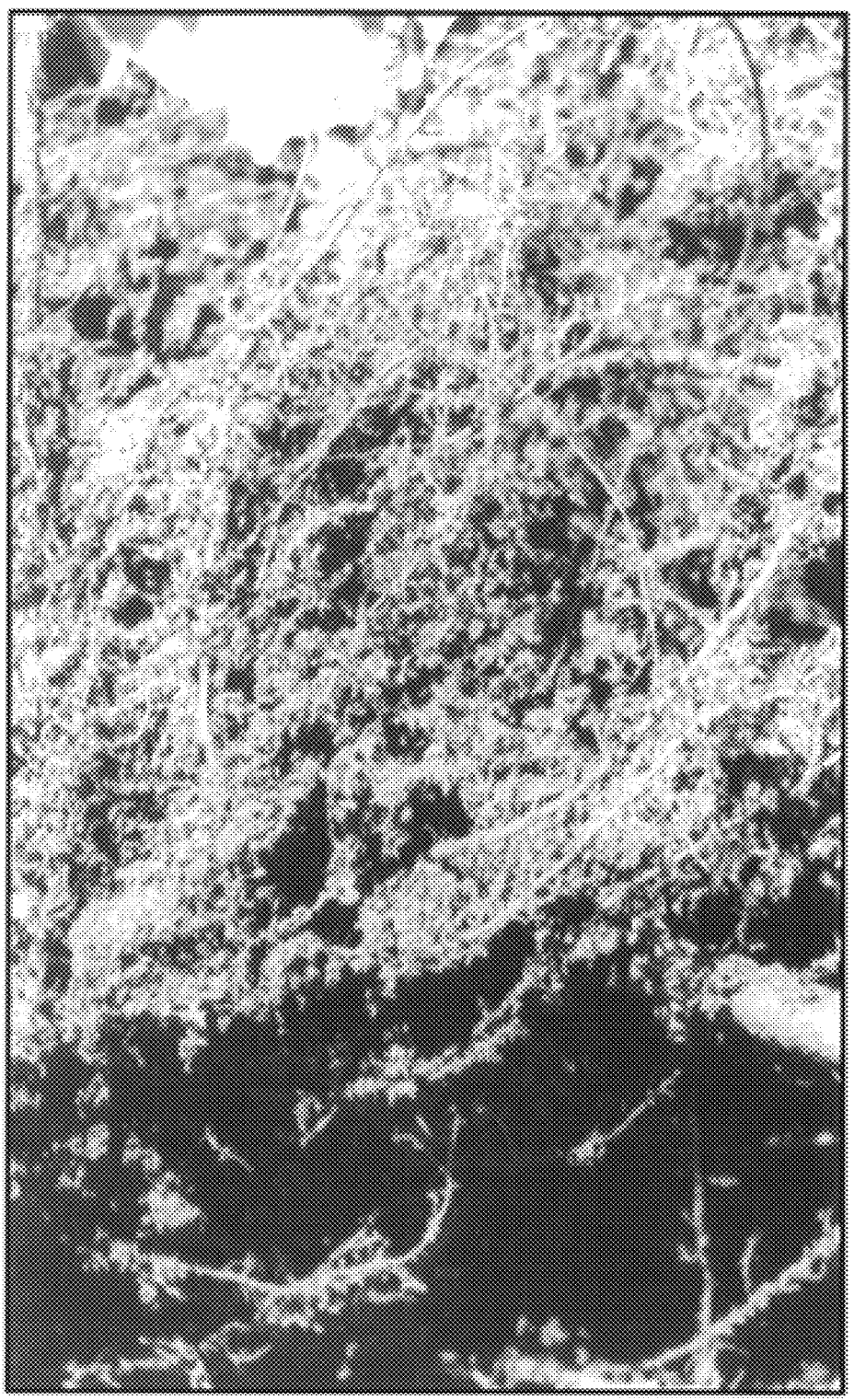
FIG. 23 is a photograph showing mycorrhizae on the roots of seedlings grown in accordance with the principles of this invention.
Figure 29:
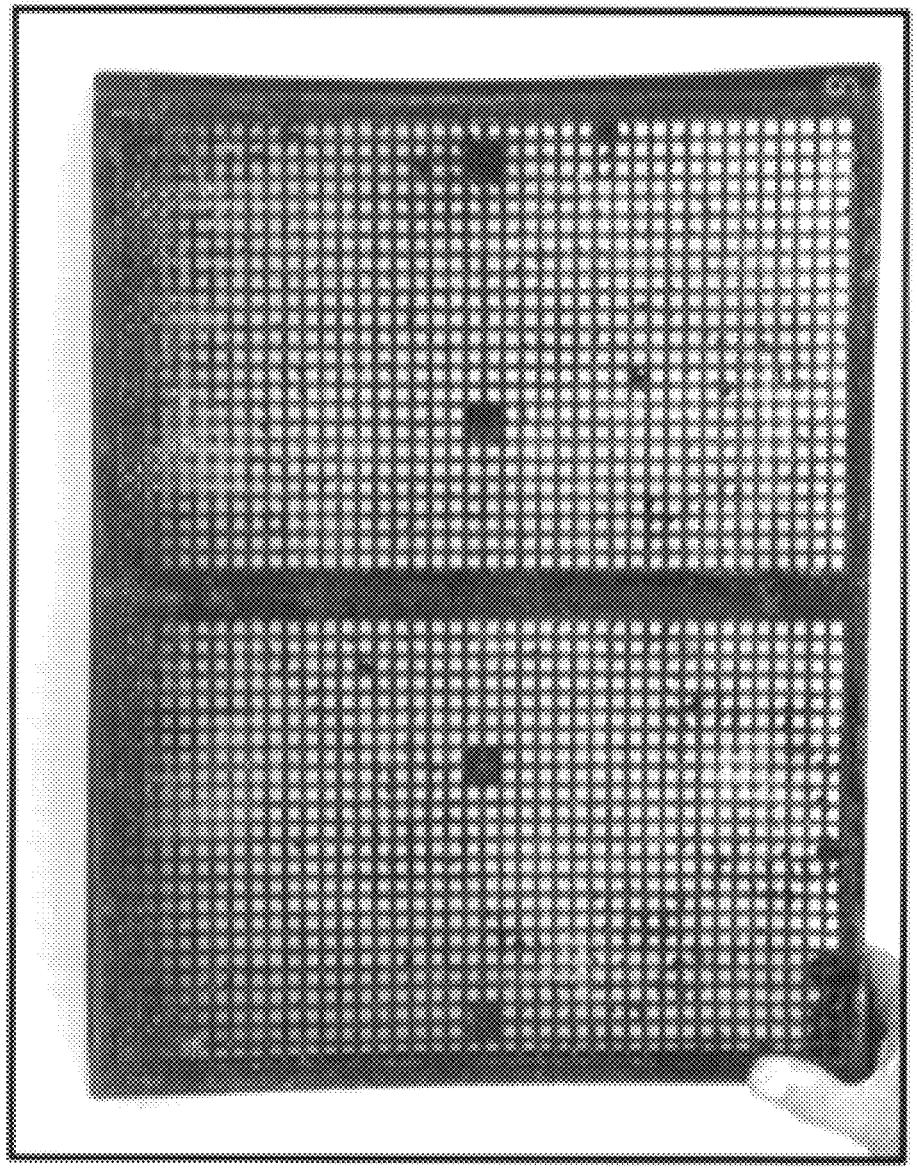
FIG. 29 is a photograph showing a bottomless flat with ⅜ in. openings for air pruning used in Step 1.

As described above, the seeding is done by placing seed on a bottomless mesh seed flat. While seed flats measuring 18½ inches×14½ inches×2½ inches deep with mesh spacing of ⅜ inches have been used satisfactorily, as shown in FIG. 29, seed flats measuring 15¾ inches×15¾ inches×5 inches deep with mesh spacing of ⅜ inches (FIG. 4) have been found to be optimum. A soil-less seeding medium and growing medium is preferably used. The seeding medium consists of 40% composted rice hulls, 40% pine bark, 20% sand, which results in a desirable 35% air space has been used satisfactorily, but a medium of 35% composted rice hulls, 35% pine bark, 20% sand, and 10% manure, which results in a desirable 35% air space has been found to be optimum. A complete slow release fertilizer plus micro-nutrients and a wetting agent are added to the medium. The growing medium is also inoculated with mycorrhizae spores which germinate and grow on and inside the tree roots in a symbiotic relationship (see FIG. 23). Research has proven these fungi play an extremely important function on trees. They provide an immune system for the trees, blocking infectious diseases. They form such a dense mass they are able to enhance the capability of the root surface up to 1,000 times further enhancing the uptake of moisture, nutrients, and air resulting in a plant that can withstand greater stress situations and still perform and grow, displaying exceptional vigor.

There is a universal problem of proper nutrient uptake by woody plants in artificial (soil-less) growing media. Through analysis of the media compared to the analysis of the leaves from plants grown in media for *Quercus bicolor*—Swamp White Oak, the inventors have determined that the addition of 10% composted manure to the growing media of composted rice hulls, pine bark, and sand plus slow release fertilizer and minor trace nutrient improves the nutrient level in the plants, with most of the nutrients moving from a low interpretation in the soil medium to a desired level within the plant resulting in maximum plant growth and performance.

The addition of manure promotes the development of a balanced biological atmosphere within the growing media, promoting the growth of numerous beneficial organisms. These organisms help promote the development of desirable soil fauna that break down organic matter releasing essential bi-products (enzymes etc.) that benefit the plant by enabling uptake of nutrients that are present in the media here-to-fore but not available in a form the plant can absorb. This resulted in a reduced fertilizer rate of 50%, resulting in substantial cost savings. Also there is less impact on the environment because of fewer nutrients leaching and run off while still achieving maximum plant growth.

The inventors have also discovered that the incorporation of ¾ of a pound of Talstar systemic insecticide in each cubic yard of growing media trans locates throughout the plants system, helps plants grown in the media to ward off attack by a number of undesirable insect pests including but not limited to Japanese beetle.

Figure 11:
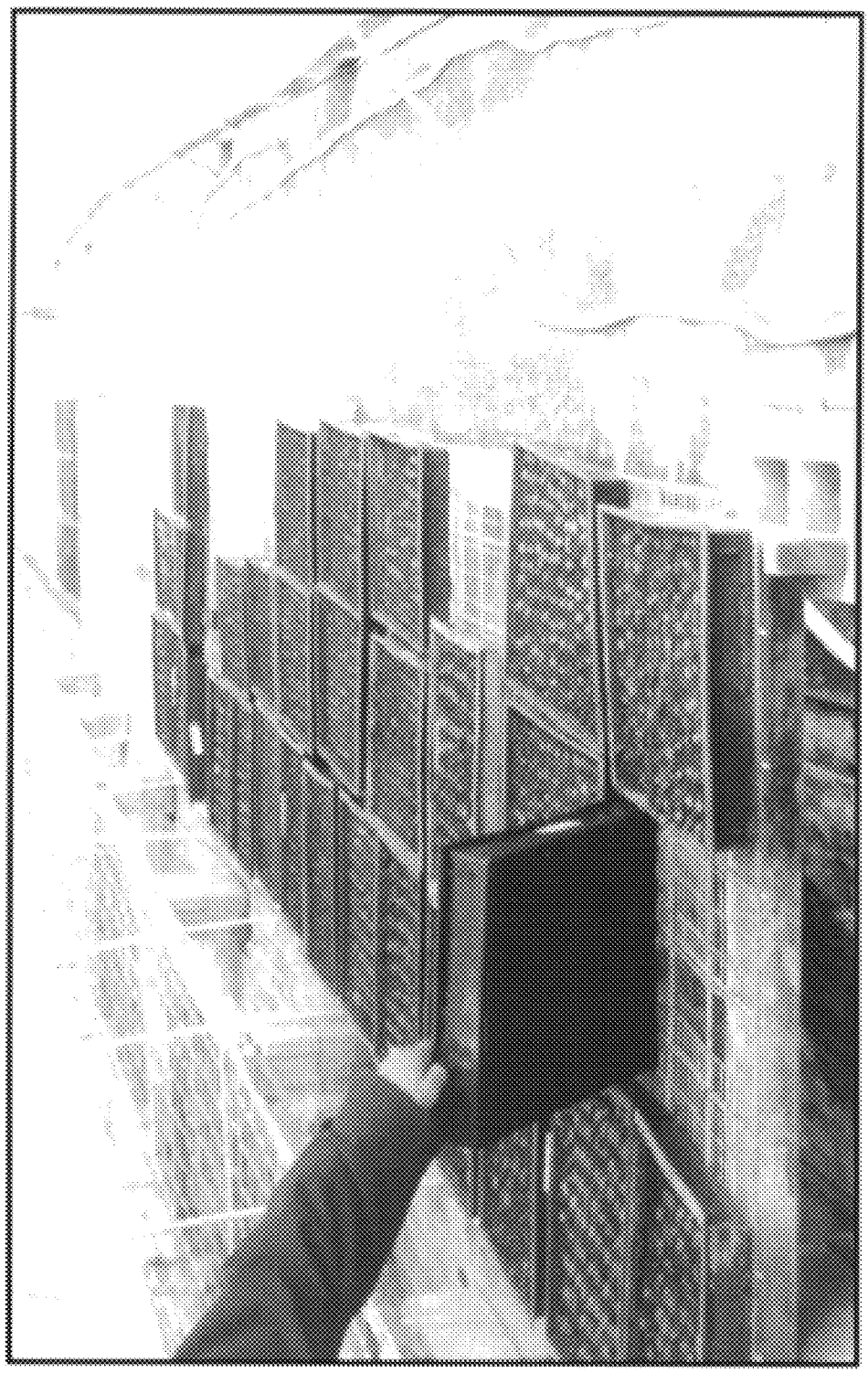
FIG. 11 is a photograph showing root radicals beginning to penetrate the bottomless flat.
Figure 12:
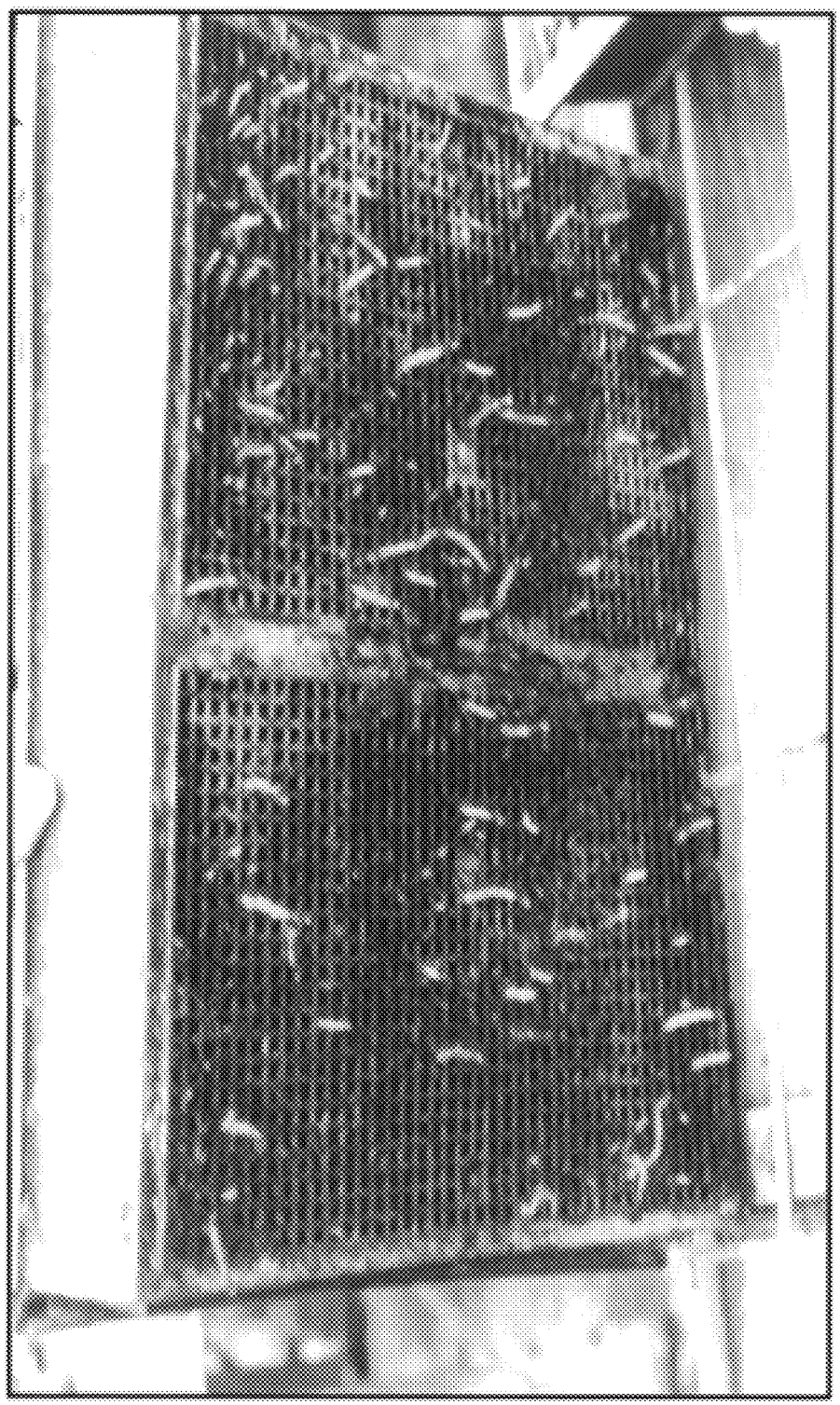
FIG. 12 is close-up photograph showing root radicals beginning to penetrate the bottomless flat.
Figure 13:
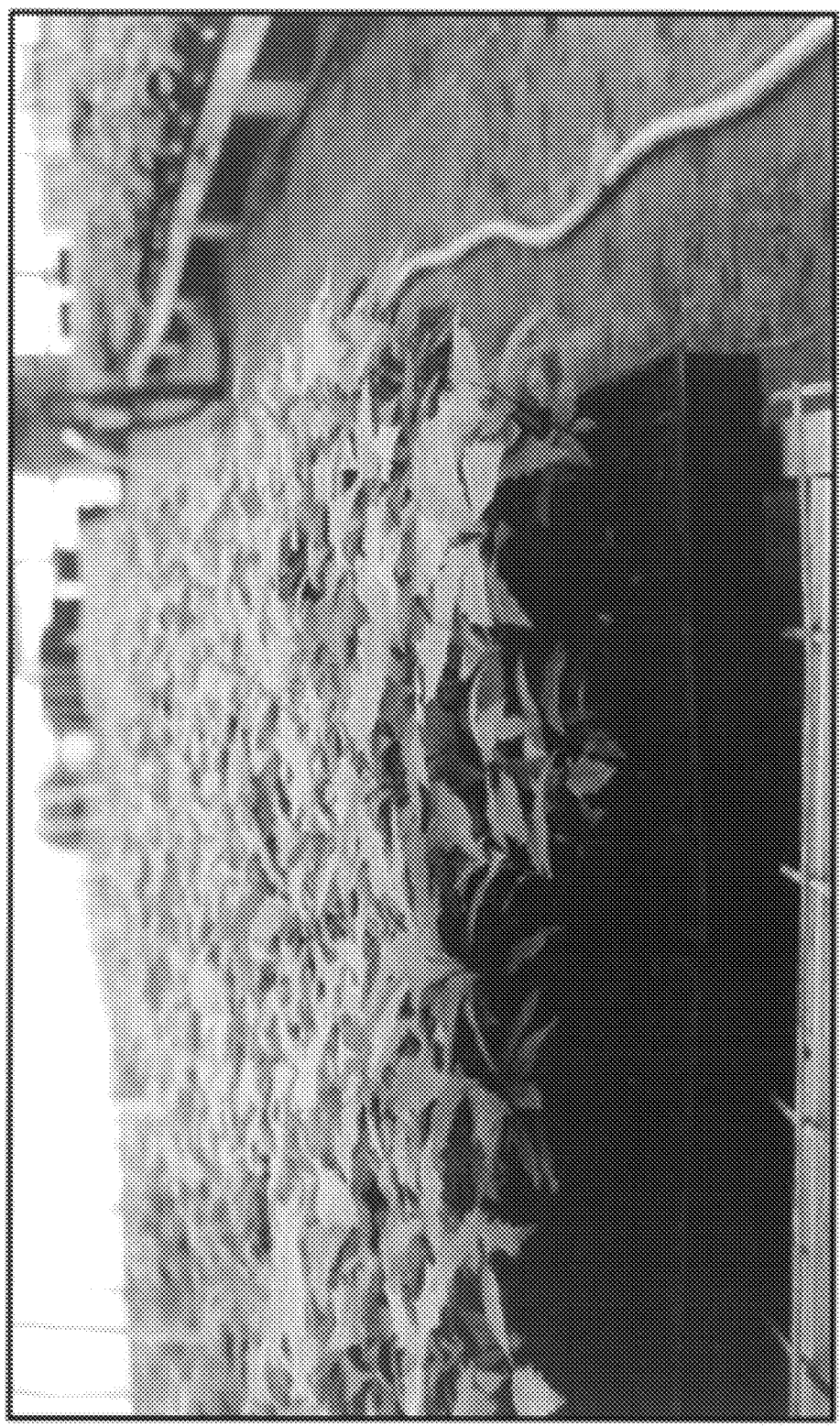
FIG. 13 is a photograph showing germinating seedlings of *Quercus bicolor;*
Figure 14:
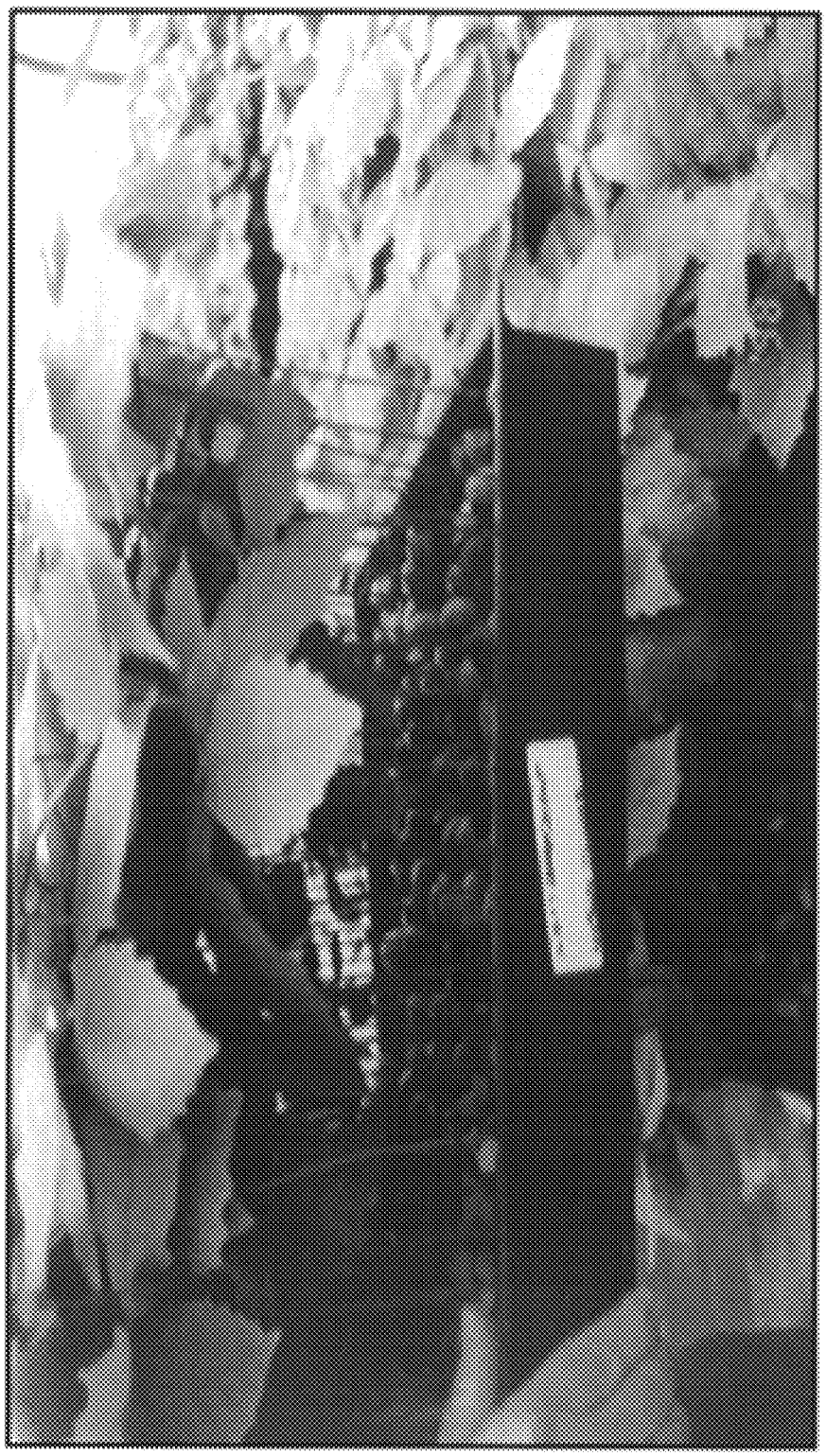
FIG. 14 is a photograph showing germinating seedlings of *Quercus bicolor* prior to grading and transplantation for the second air root pruning step.
Figure 15:
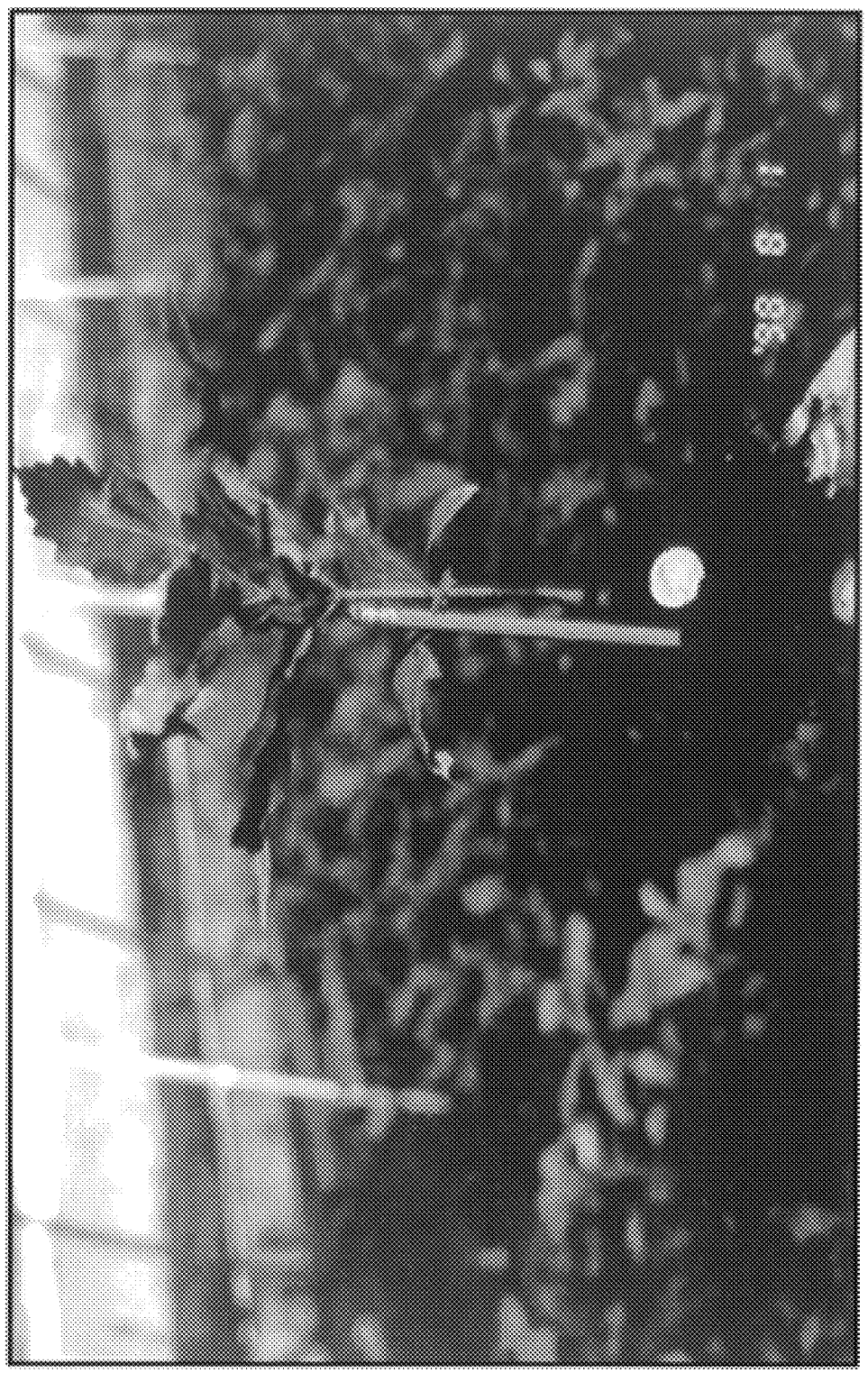
FIG. 15 is a photograph showing germinating seedlings of *Quercus bicolor* during the step of grading the seedlings by height and caliper resulting in taller individuals with larger caliper.
Figure 36:
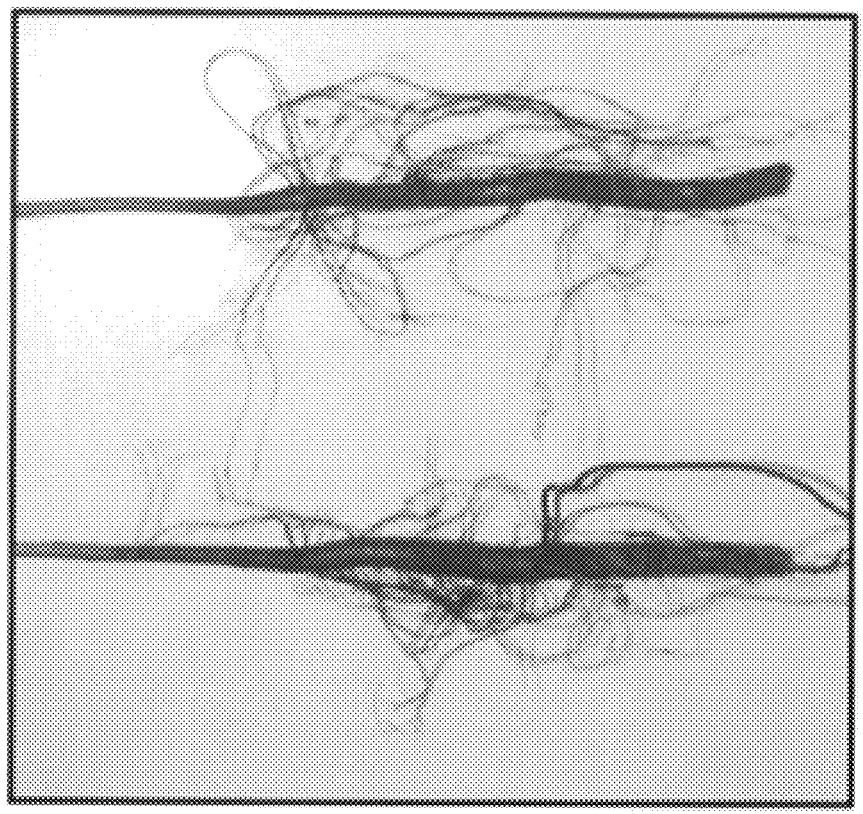
FIG. 36 is a photograph of the root system of two or three year old Pecan grown with convention methods.
Figure 37:
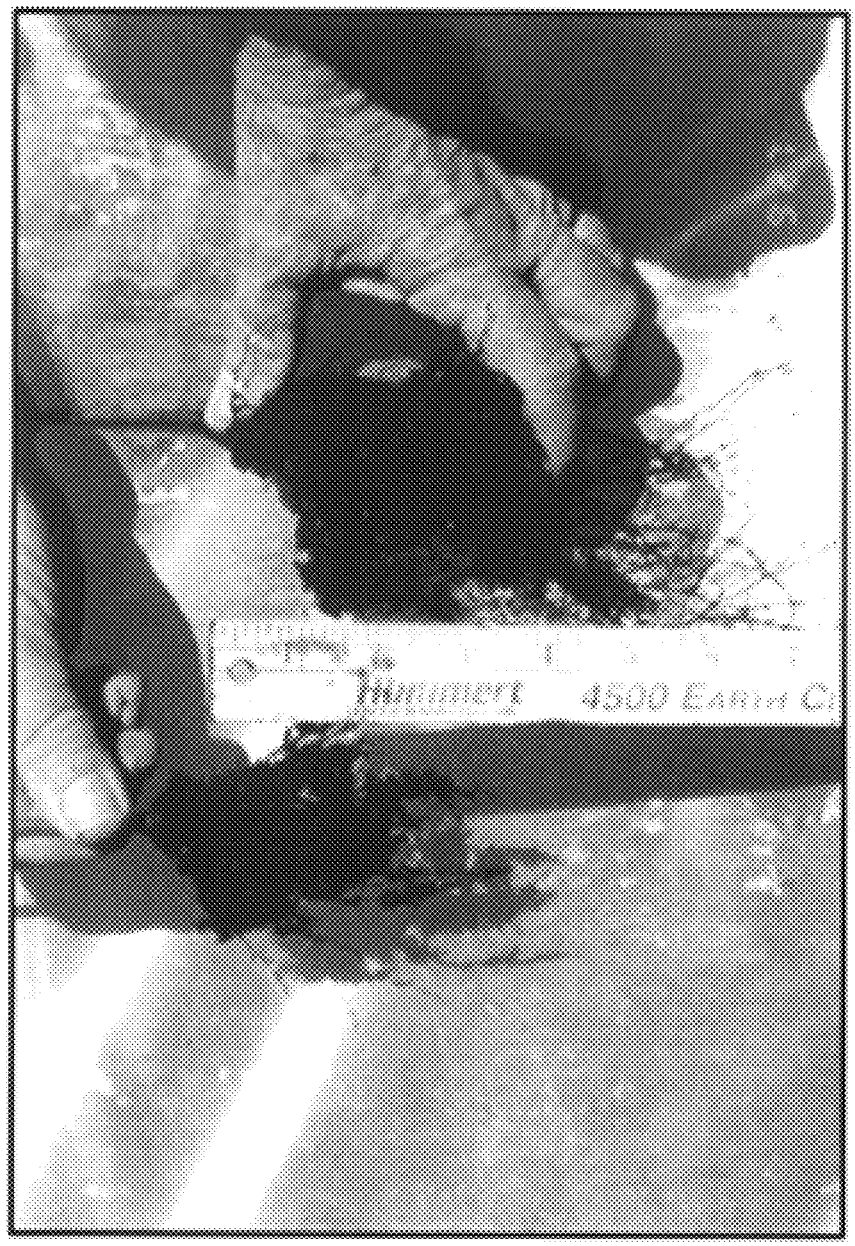
FIG. 37 is a photograph of two air pruned 75 day old Pecan grown in accordance with the principles of this invention.

As shown in FIGS. 10 and 11, in the first air-pruning step, seeded flats are placed on raised greenhouse benches with air circulating beneath the benches. As germination of the seed begins to occur in the above-described bottomless flat, the following sequence occurs. The seedling radical (tap root) penetrates down through the media and emerges through the ⅜ inch mesh, coming into contact with air circulating beneath the raised bench (see FIG. 12). The root tip is killed (dried) by the air, at a depth of 3 inches. Compare FIG. 37, showing a conventionally grown pecan seedling, with FIG. 36 showing a pecan seedling grown in accordance with the principles of the present invention. The shallow air pruning achieved with the method of the present invention induces rapid lateral root development high (where most desired) on the tree root collar where their function to the welfare of the tree will be best served.

Figure 31:
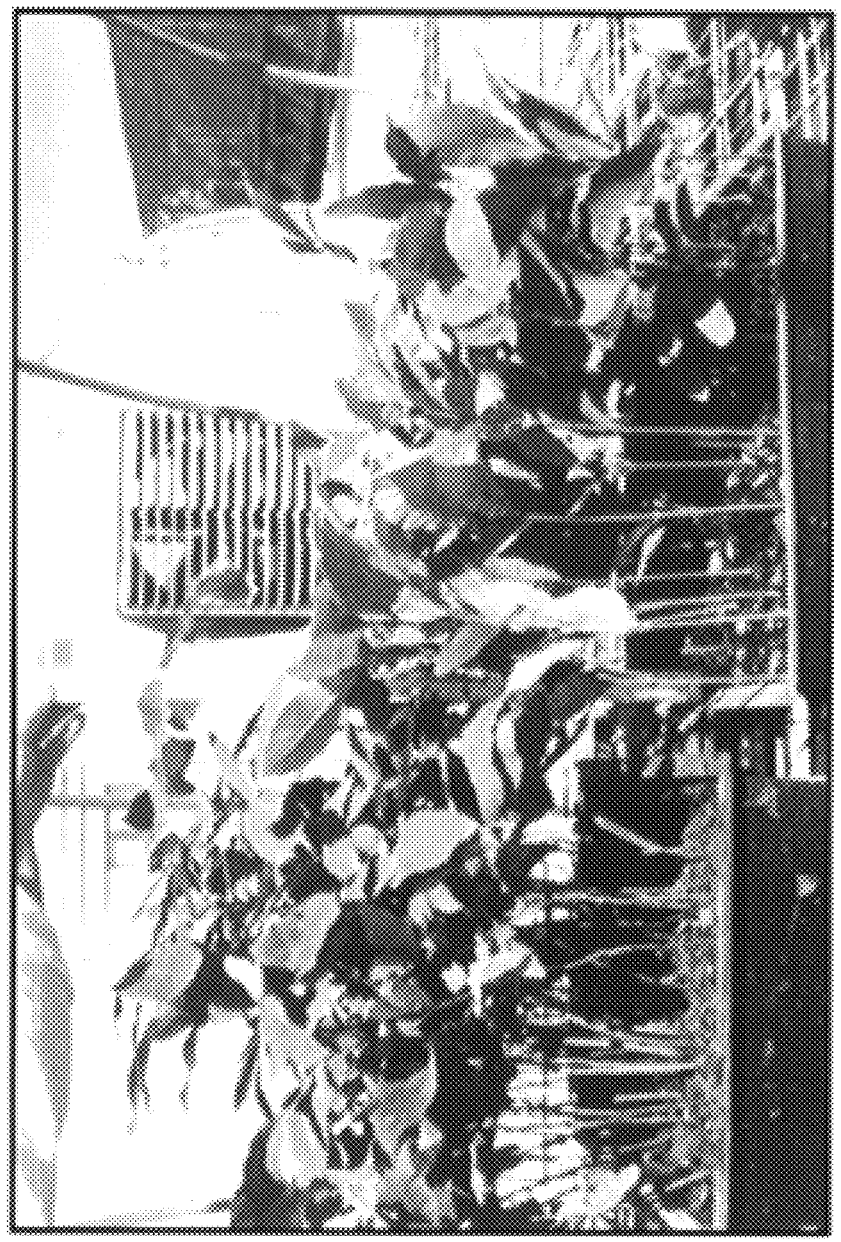
FIG. 31 is a photograph of pecan seedlings new system of air pruning at 3 in. depth on left showing better growth at time of selection and grading.
Figure 32:
FIG. 32 is a photograph showing the difference between air root pruning at 2 inches (left) versus at 3 inches (right)
Figure 33:
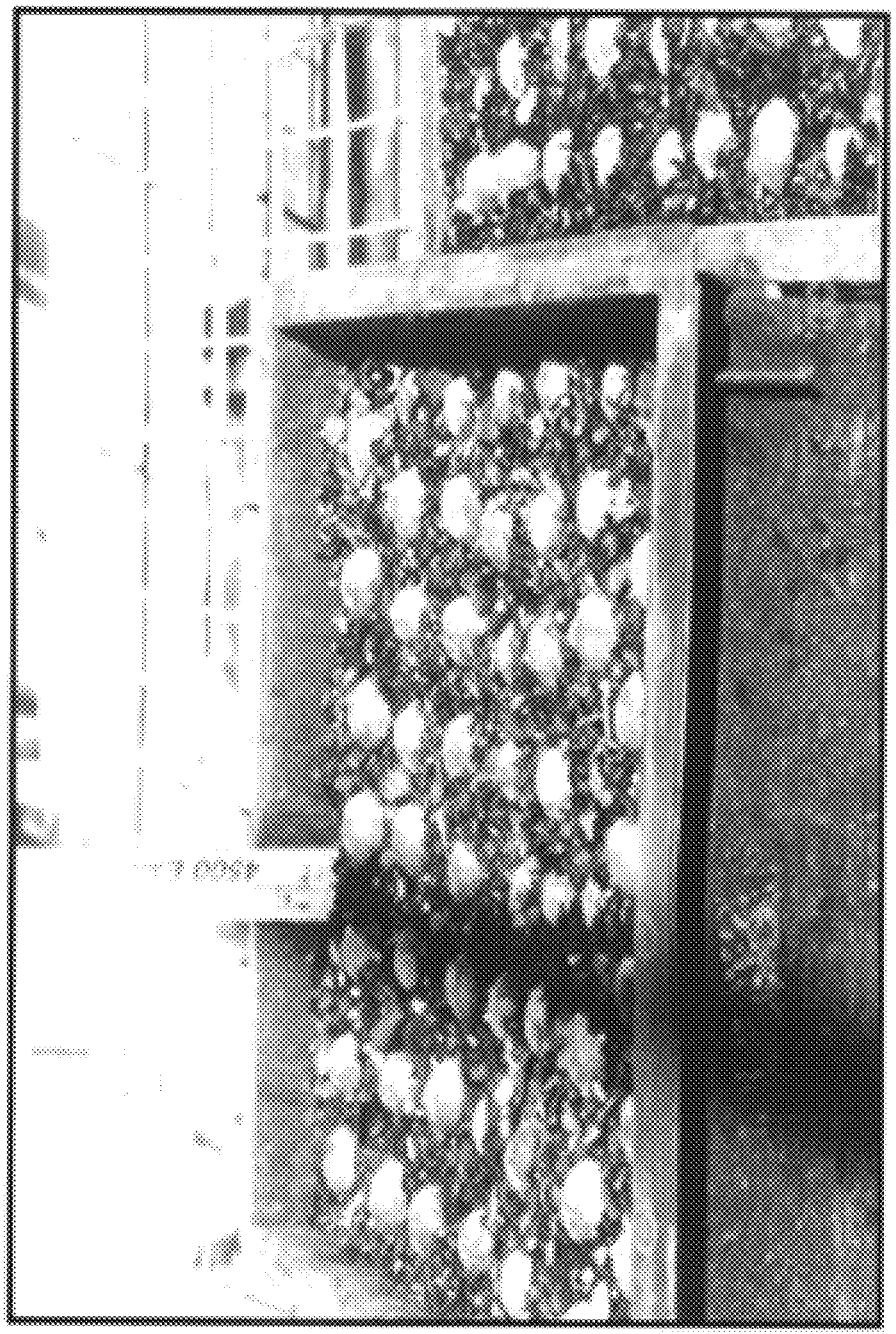
FIG. 33 is a photograph of Pecans seeded in an air pruning flat.
Figure 34:
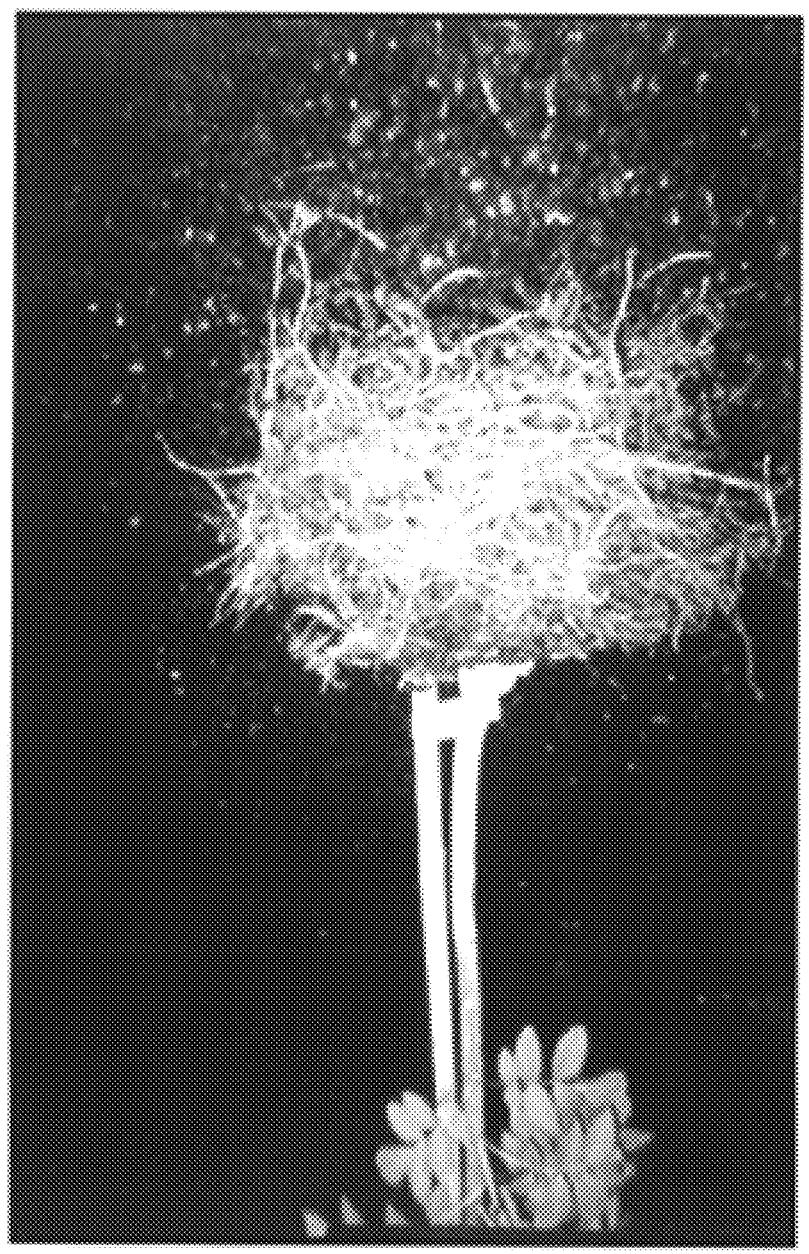
FIG. 34 is a photograph of European Ash root 160 days from planting grown in accordance with the principles of this invention.
Figure 35:
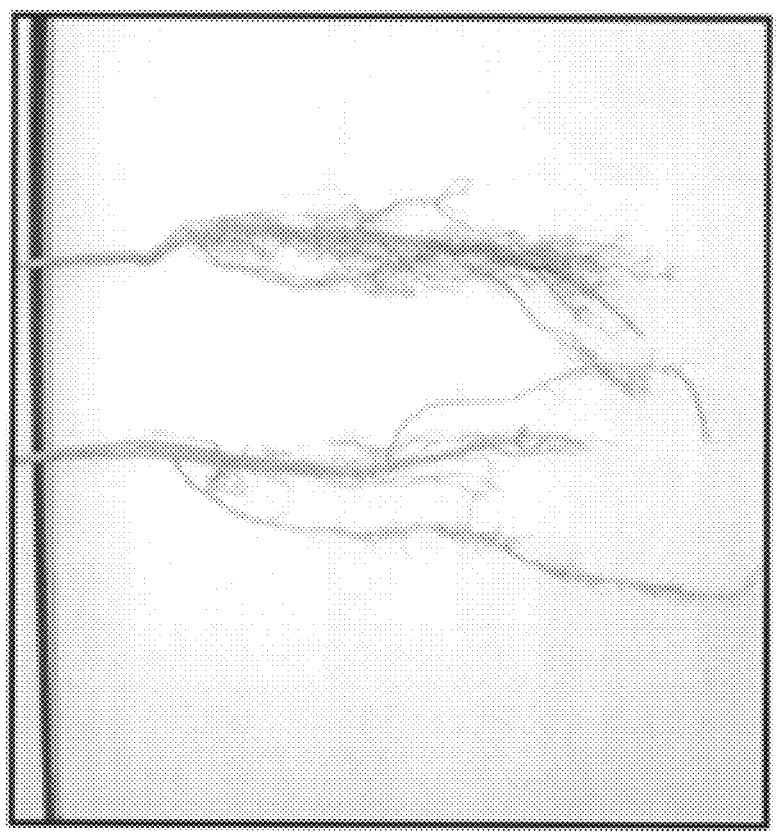
FIG. 35 is a photograph of European Ash root 160 days from planting grown with conventional method.

This root pruning preferably occurs at about 2½-3 inches. Extensive research conducted by the inventors has established that the ideal depth for the first air root pruning (FIGS. 31 and 32) is about 3 inches.

As shown in FIG. 30, in the second air-pruning step, graded seedlings are transplanted into a bottomless band measuring 3 9/16×3 9/16×4¼ inches. This size band has been found to give improved growth and improves the root distribution in the production container. The Step II transplanted seedling bottomless bands are placed on raised bottomless benches to promote additional air pruning, which occurs on secondary lateral roots further enhancing the development of a shallow dense root mass with many root tips. The first two steps are timed so the bands are ready to be transplanted outside in the container production area during early May to avoid late frosts, but timed to take advantage of a full growing season. Timing is further important because if properly handled it can coincide with the tree setting a temporary terminal bud. When this occurs, photosynthate is trans located from the leaves down to the roots. This promotes very active root development, thus quick establishment in the container area resulting in accelerated growth.

The inventors' research also determined that the optimum size of the container for Step II is a bottomless tree band measuring 3 9/16 inches×3 9/16 inches×4¼ inches deep (see FIG. 30) produces the ideal root mass to top (all of plant above soil) ratio.

| BOTTOMLESS BANDS TESTED |
| --- |
| Band Size |
| 1¼ × 1¼ × 3¾ |
| 2½ × 2½ × 3¾ |
| 2¾ × 2¾ × 5½ |
| 3 9/16 × 3 9/16 × 4¼ |

This shallow air pruning is unique to the method of this invention, and enhances the root system resulting in the production of a superior plant that can survive, perform, and grow faster under every condition tested. Prior root pruning methods typically prune at least 5 inches or more. The shallower air pruning of the present invention induces rapid lateral root development high on the tree root collar, where most desirable, and where their function to the welfare of the tree will be best served.

The inventors have also tested various bench heights (i.e., the height from the greenhouse floor to the wire mesh supports) under a strictly controlled greenhouse environment, for both the first and second air root pruning steps. Heights of 12, 18, 24, 30, and 36 inches were all carefully tested. While there was little differences in the 30 and 36 inches bench heights, both were far superior in air flow and subsequent root pruning to 12, 18, and 24 inches. As a result, the inventors have determined that balancing effectiveness of root pruning versus construction and installation costs, and ergonomic considerations, a height of 30 inches is optimum.

The seedlings are graded to identify the genetically superior individuals. Experience and research has proven that selecting the largest seedlings after their first flush of growth identifies those individuals that will remain dominant, grow faster, and exhibit genetic superiority when grown to a larger size and eventually out planted. When grading, particular attention is given to the combination of height, caliper, and root development. On most species of woody plants the top 50% are retained and transplanted and the remaining plants are discarded. This grading process has proven to be a significant step in tree improvement.

The graded seedlings are then transplanted into a bottomless band measuring 2⅞"×2⅞"×3¾" in depth. (This short band gives improved growth and improves the root distribution in the production container.) The transplanted seedlings in the bottomless bands are placed on raised bottomless benches to promote additional air pruning, which occurs on secondary lateral roots further enhancing the development of a shallow dense root mass with many root tips. The first two steps are timed so the plants are ready to be transplanted outside in the container production area immediately after the last frost date (early May in Missouri) to avoid late frosts, but timed to maximize the growing season. It is also desirable to coordinate transplantation outside with the tree's setting a temporary terminal bud. When this occurs, photosynthate is trans-located from the leaves down to the roots. This promotes very active root development, and thus quick establishment in the container resulting in accelerated growth.

Figure 16:
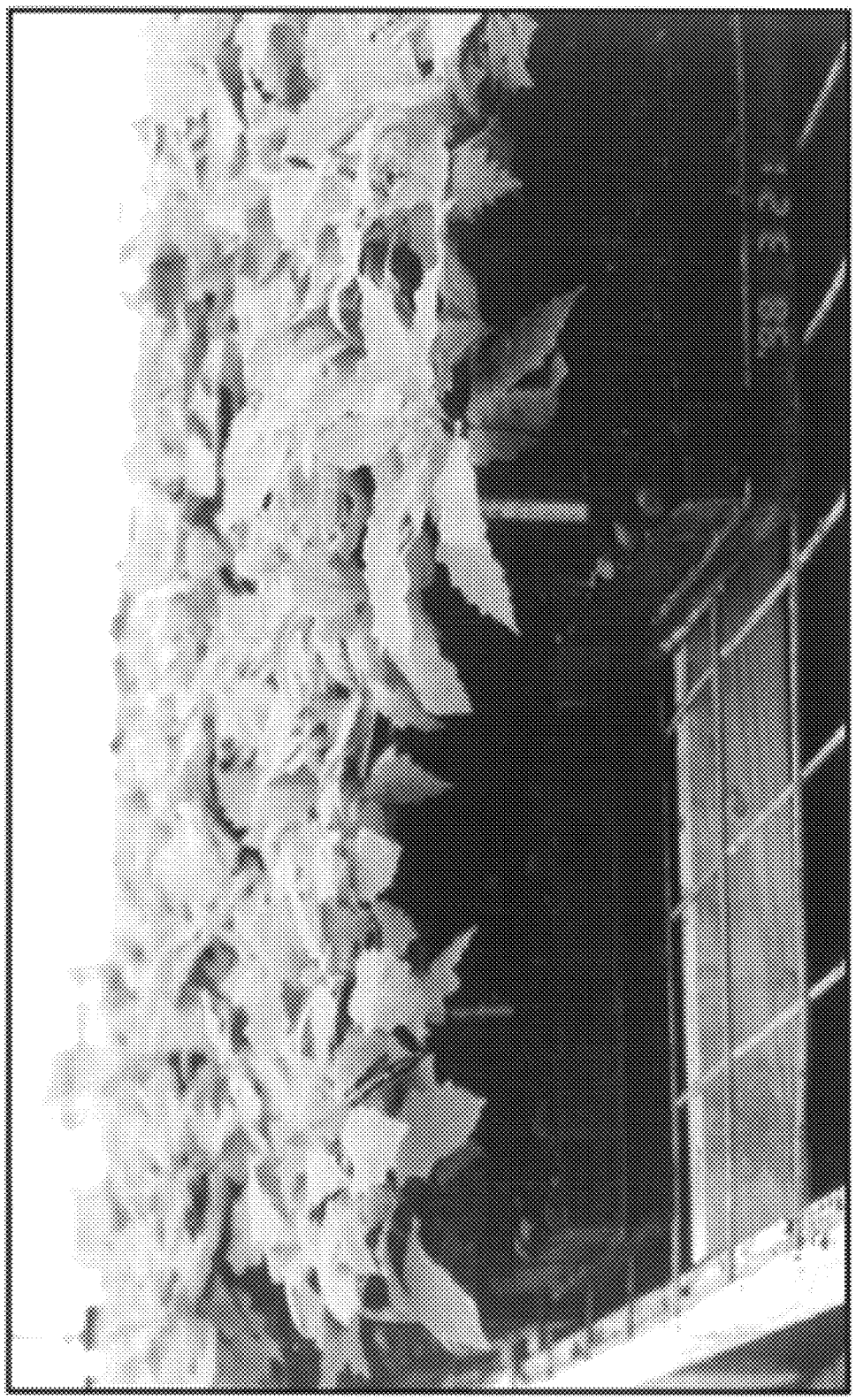
FIG. 16 is a photograph showing the seedlings transplanted into bottomless bands in flats for the second air-pruning step.
Figure 19:
FIG. 19 is a photograph showing container ready for transplantation of the seedlings after the second root pruning step.
Figure 20:
FIG. 20 is a photograph illustrating the transplantation of seedlings after the second air root pruning step.
Figure 21:
FIG. 21 is a photograph showing *Quercus rubra* (Northern Red Oak) seedlings at a height of about 7 feet, 210 days from germination.

As shown in FIG. 16, while in the greenhouse, the bands are preferably contained in bottomless flats each holding 25 tree bands. When preparing to transplant out of doors plants must be handled in a special manner to make the proper transition from a controlled greenhouse environment to a more stressful outdoor environment. The greenhouse process conditions the stomata (openings on the underside of the leaf) to lose their elasticity and they are unable to narrow or close and control transpiration (water loss) and the cuticle, a waxy layer that forms on the leaf surface and protects the leaves has not formed. Both of these conditions correct themselves in 48 hours when placed outdoors in full sunlight. During this period they are intermittently misted to relieve stress while becoming acclimated. After becoming acclimated they are moved to a container production area (see FIG. 20), and transplanted into existing pre-filled containers (see FIG. 19). A shallow wide growing container is used, because most of the feeder roots remain in the upper six to eight inches of soil after out-planting. The growing container measures 10 inches across and 7 inches deep (see FIG. 19). This allows 25% more lateral root development than a smaller size previously used. This production system results in growth to a marketable size in one growing season of approximately 210 days from date of seed germination (see FIG. 21).

Figure 22:
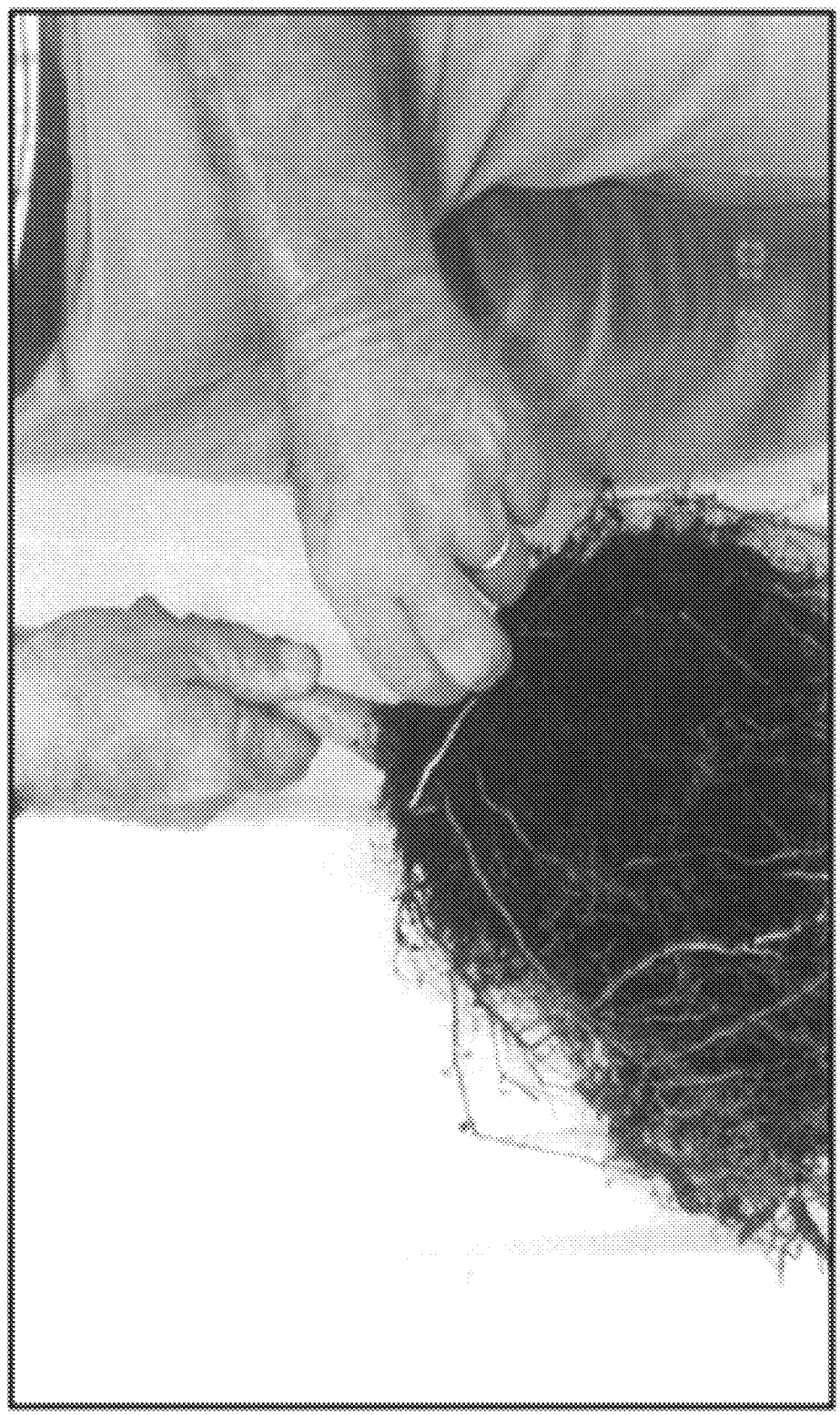
FIG. 22 is a photograph showing the root system of the seedlings shown in FIG. 21.

As shown in FIG. 22, the root mass achieved with the methods of the present invention eliminates losses often experienced using conventionally grown trees, especially those recognized to be difficult to transplant, such as Oak, Hickories, Ash, and Nut Trees. Using the methods of this invention, the inventors have achieved consistent survival rates greater than 95%, even at very stressful sites such as wetlands, (where flooding occurs), mine reclamation sites, and construction sites.

Figure 24:
FIG. 24 is a photograph showing the development of a root system of an oak tree after four years.
Figure 25:
FIG. 25 is a photograph showing the development of root system of an oak tree after four years.
Figure 26:
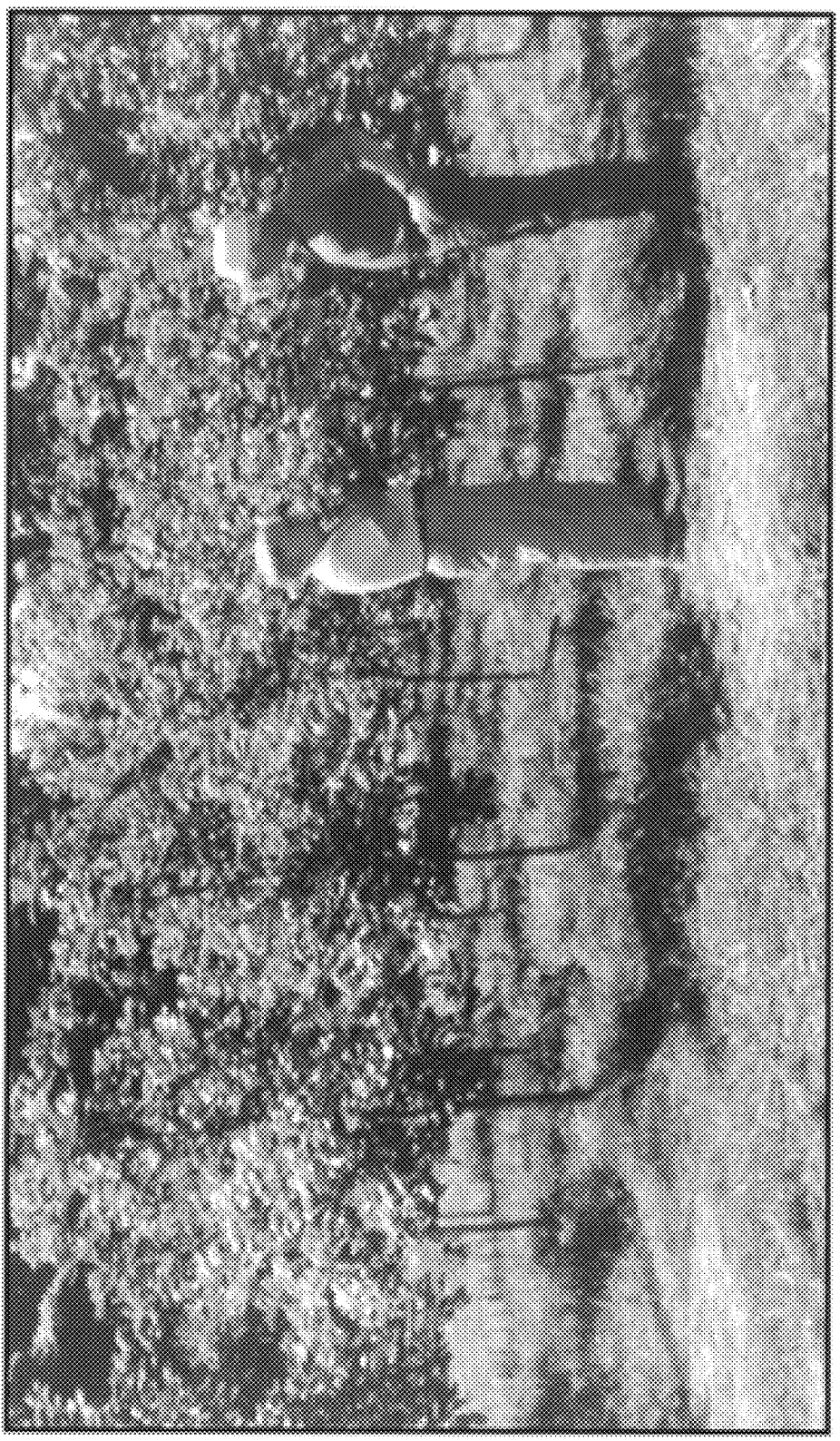
FIG. 26 is a photograph showing the early fruiting (3 years) of *Quercus bicolor* grown in accordance with the principles of this invention.

The trees produced with the method of this invention grow an average of three times faster than conventionally grown seedlings. As show in FIGS. 24, 25, and 26, even after 15 years, the trees grow at 3 times the rate of conventionally produced trees. This accelerated growth rate greatly increases the value and economics of tree farming. Using the methods of this invention, the rate of turnover in most tree production could be increased by 50% or more and make tree farming a profitable and viable growing enterprise.

Figure 27:
FIG. 27 is a photograph showing the early fruiting (3 years) of *Quercus bicolor* grown in accordance with the principles of this invention.
Figure 28:
FIG. 28 is a photograph showing the early fruiting (3 years) of *Quercus muehlenbergii* grown in accordance with the principles of this invention.

Most varieties of trees grown under this production system have exhibited early flowering and fruiting characteristics. Examples are Swamp White Oak (*Quercus bicolor*) and Bur Oak (*Quercus macrocarpa*). It is generally accepted in the literature that these species begin flowering and fruiting at about 20 to 25 years of age. See, Schopmeyer, Seeds of Wood Plants in the United States, Agriculture Handbook No. 450, Forest Service, U.S. Department of Agriculture, Washington, D.C., Table 2 (1974), incorporated herein by reference. However, as shown in FIGS. 27 and 28 trees of these species grown in accordance with the methods of the present invention have consistently produced fruit in the 3rd year after out-planting. The inventors believe that these plants have as many root tips (where the hormones are produced) as naturally grown 20 to 25 year old trees. This fast fruiting is very valuable from a regeneration and wildlife food standpoint. The inventors' research indicates this same response occurs in both nut trees and fruit trees, specifically pecans, walnuts and apples.

Figure 17:
FIG. 17 is a photograph showing the root system of *Quercus bicolor* after 30 days, at the time of transplantation for the second root pruning step.
Figure 18:
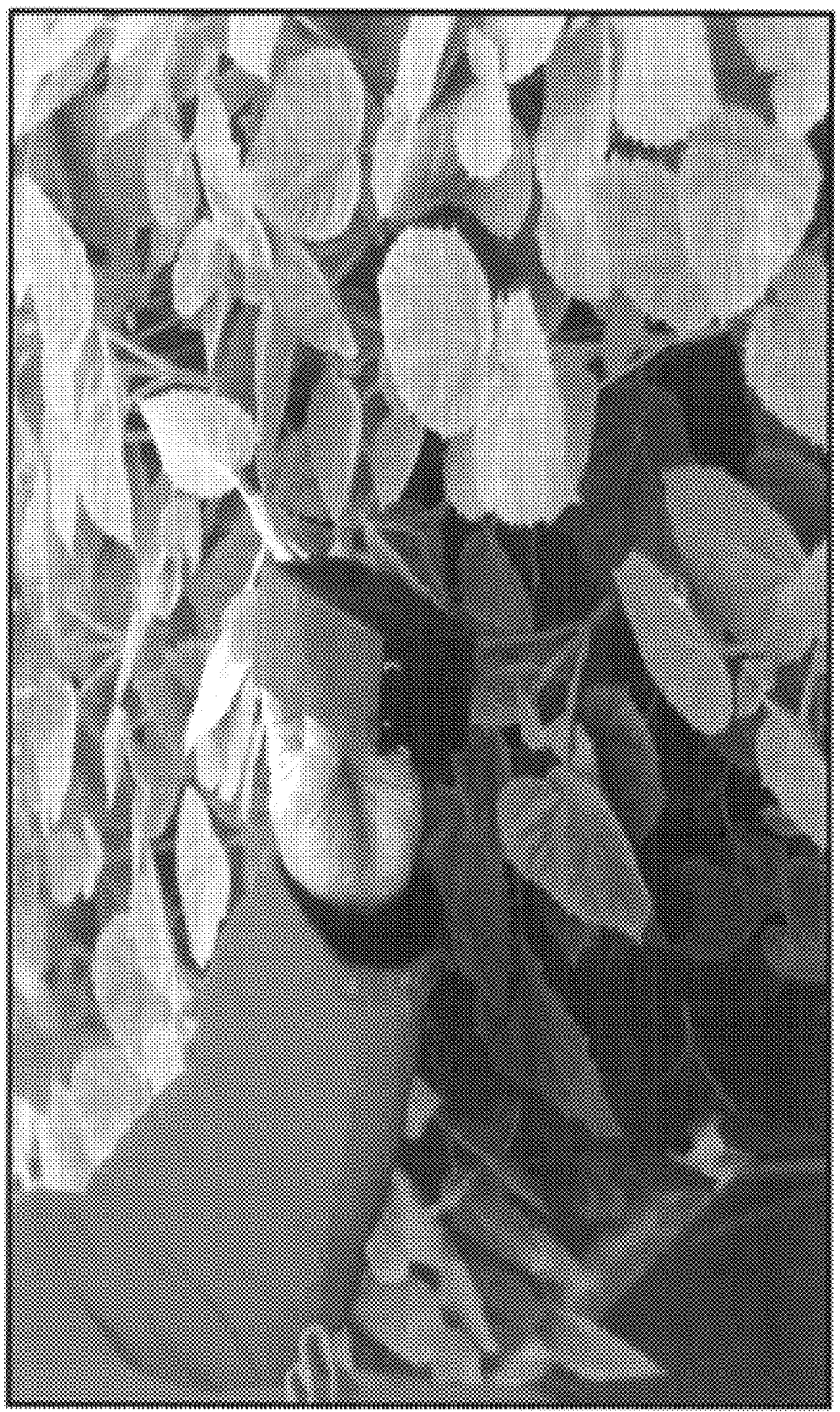
FIG. 18 is a photograph showing the root radicals protruding through the bottom of the bottomless bands during the second air root pruning step.

Specific differences between the method of the present invention, and prior methods of tree production include: (1) the shallow depth of air pruning (about 2½"); (2) seed grading to select genetically superior seeds; (3) transplantation after the first root pruning to bottomless bands to further increase root mass, as shown in FIGS. 16, 17, and 28; (4) the shallow depth of the bottomless band compared to conventional deeper containers that accommodated the tap roots 3 9/16 inches×3 9/16 inches×4¼ inches; (5) the growing medium (see FIG. 19) that combines the proper amounts of air, nutrients, and beneficial natural soil born organisms in balance with an enhanced root system that properly utilizes and assimilates them, the result is greatly accelerated growth rates that persists for years; (6) high transplantability and survival of trees produced with the method of this invention, which is nearly 100% survival when out-planted under virtually all conditions, and greater than 95% plus on stressed sites where conventional produced seedlings survived at rates of 2% or less. Sites tested include wetlands that are repeatedly flooded, strip mine reclamation, and other problem planting sites and conditions.

The inventors have propagated approximately 750,000 containerized oak and nut tree seedlings per year, many of which have been out-planted on abandoned mine lands, old wetland sites and fields in central and western Missouri. First-year establishment success for containerized seedlings is approximately twice the success of bare-root seedlings in side-by-side field trials. Greatest mortality resulted from excessive competing vegetation and rodent damage in winter. Tap-rooted hardwoods such as oak, hickory, and walnut responded well to air-pruning, which resulted from using bottomless containers. Seedlings were propagated and placed upon a raised, welded hog or cattle panel, with four-inch squares, protected from squirrels by a wood frame and chicken wire.

Qualitative observation of establishment success suggests a first-season survival rate of 90 percent for air-pruned bur oak and pecan grown in half-gallon bottomless containers. This compares to 40 to 50 percent survival of year old bare-root stock grown at a local nursery. These were side-by-side trials of seedlings planted in prepared rows of prairie soils in Conservation Reserve Program (CRP) crop fields in western Missouri. Rows were set at 15-foot centers, disked, and planted by hand. Containerized seedlings were planted in fall, and bare-root seedlings were planted in spring. Success rates were slightly higher in very fine sandy loam soils mapped as Bates loam, (2 to 5 percent slopes, fine-loamy, siliceous, therrvic (Typic Argiudolls) compared to silty clay soils mapped as Kenoma (2 to 5 percent slopes, fine, montmorillinitic, thermic Vertic Argiudolls) (USDA 1995). Competition became intense in mid-summer as late-season weeds such as common and giant ragweed; cocklebur and begger ticks germinated from the old-field seedbank. The rows were mowed in July to prevent shading of the seedlings.

A second test plot was established on rough-graded, neutral mine spoils (silty clay texture with 15 percent shale channers, 5 percent sandstone pebbles and few sandstone cobbles) in western Missouri. Establishment success in the first season was approximately 75 percent for containerized bur oak and pecan compared to 30 percent for bare-root seedlings. Compaction was minimal since all grading was performed by a D-3 dozer knocking the tops off the spoil-ridges, pushing the fill into the valleys between ridges. Wind-disseminated species, particularly broomsedge, slowly colonized the plots, competing with the seedlings. Adjacent mine spoils were heavily vegetated, enabling deer to browse the plot undisturbed.

A third test plot was established in central Missouri on loess-derived forest soils that had been cleared in the 19th century, farmed and planted to tall fescue in recent decades. In places, much of the A horizon had been eroded and mixed by plowing into the E horizon. The soils were classified as eroded Winfield silt roam (fine-silty mixed mesic. Typic Hapludalfs) (USDA 1994). Fescue sod was removed with a heavy hoe around each seedling to reduce competition at the time of establishment. Spraying also is effective; but the seedlings should be dormant. First-year success rates for containerized bur and northern red oak were 90 percent compared to 25 percent for bare-root.

The following table shows a hypothetical cost/benefit analysis of plants grown in accordance with the principles of the present invention versus conventional bare root plants.

HYPOTHETICAL COST/BENEFIT, SURVIVAL AND ENHANCED GROWTH RATE COMPARISON BETWEEN SEEDLINGS GROWN IN ACCORDANCE WITH THE PRESENT INVENTION AND BARE ROOT SEEDLING OAK TREES

| DESCRIPTION | BARE ROOT 1 | BARE ROOT 2 | BARE ROOT 3 | INVENTION (UPLAND) | INVENTION (DOWNLAND) |
|---|---|---|---|---|---|
| SURVIVAL RATE | 85% | 50% | 30% | 90% | 90% |
| Cost per 1000 planted | $ 500 | $ 500 | $ 500 | $ 7500 | $ 7500 |
| Survival per 1000 planted | 850 | 500 | 300 | 900 | 900 |
| Years of fruit production | 0 | 0 | 0 | 10 | 10 |
| Pounds of fruit production | 0 | 0 | 0 | 36,000 | 36.000 |
| Carbohydrate value (based on corn) | 0 | 0 | 0 | 14,398 | 14,398 |
| Average dhb | 16 inches | 16 inches | 16 inches | 20 inches | 24 inches |
| Wood fiber yield per tree | 81 brd ft. | 81 brd ft. | 81 brd ft. | 170 brd ft. | 260 brd ft. |
| Total Volume of wood fiber | 68,850 | 40,500 | 24,300 | 153,000 | 234,000 |
| Value per 1000 planted @ 0.30/brd ft. | $20,655 | $12,150 | $ 7,290 | $ 45,900 | $ 70,200 |
| Value of early fruiting | 0 | 0 | 0 | $ 14,398 | $ 14,398 |
| Total value | $20,655 | $12,150 | $ 7,290 | $ 60,298 | $ 84,598 |
| Cost | $ 500 | $ 500 | $ 500 | $ 7500 | $ 7500 |
| Gross Return | $20,155 | $11,650 | $ 6,790 | $ 52,798 | $ 77,098 |

What is claimed is:

1. A method of facilitating air root pruning of seedlings, the method comprising:
   placing seeds on a surface of a growing medium;
   germinating the seeds on the surface of the growing medium to obtain seedlings;
   subjecting the seedlings to a first air root pruning by growing the seedlings in a first bottomless container of 2½ inches to 5 inches deep; and after the first air root pruning, subjecting the seedlings to a second air root pruning by growing the seedlings in a second bottomless container of 3 inches to 5½ inches deep.

2. The method according to claim 1, wherein the growing medium comprises 35% to 40% composted rice hulls and 35% to 40% pine bark.

3. The method according to claim 1, wherein the air root pruning of the roots of the seedlings is performed by the growing medium being in one or more containers having an open bottom, the one or more containers adapted to be set on a mesh support.

4. The method according to claim 3, wherein the open bottom and mesh support are configured to expose to air at least some roots of the seedlings growing in the one or more containers.

5. The method according to claim 1, further comprising stratifying the seeds on the growing medium at 32 degrees F. prior to the seeds germinating.

6. The method according to claim 1, wherein the seedlings are transplanted between the first and second air root prunings.

7. The method according to claim 1, wherein air pruning of the seedlings' roots comprises growing the seedlings in bottomless flats at a height of between about 24 inches and about 36 inches above the ground.

8. The method according to claim 1, wherein the growing medium is inoculated with mycorrhizae spores.

9. The growing medium according to claim 1, further comprising a systemic insecticide.

10. A method of developing new seedlings comprising:
germinating seeds on the surface of a growing medium to obtain the seedlings;
air pruning roots of the seedlings at a depth of 2½ to 5 inches,
transplanting one or more air pruned seedlings from a first container to a second container; and
air pruning the roots of the transplanted seedling in the second container at a depth of 3 inches to 5½ inches.

11. The method according to claim 10, wherein the growing medium comprises 35% to 40% composted rice hulls, 35% to 40% pine bark, and 20% sand.

12. The method according to claim 10, wherein before germinating the seeds on the surface of the growing medium, the seeds are placed on the surface of the growing medium, and the seeds are stratified on the growing medium at 32 degrees F.

13. The method according to claim 10 wherein air root pruning of the seedlings' roots comprises growing the seedlings in one or more containers having an open bottom, the one or more containers adapted to be set on a mesh support.

14. The method according to claim 10, further comprising air pruning the seedling roots by allowing roots of the seedlings to be exposed to air in bottomless containers at a height of between 24 and 36 inches above the ground.

15. The growing medium according to claim 10, further comprising micronutrients and a wetting agent.

16. A method of improving the root structure of seedlings, the method comprising:
placing seeds on a surface of a soil-less growing medium for germination on the surface of the growing medium to obtain seedlings;
subjecting the seedlings to a first air root pruning by growing the seedlings in a bottomless container of 2½ to 5 inches deep; and
subjecting the seedlings to a second air root pruning by growing the seedlings in a bottomless container of 3 to 5½ inches deep,
wherein the growing medium comprises 35% to 40% composted rice hulls, 35% to 40% pine bark, and 20% sand.

17. The method according to claim 16 further comprising transplanting the seedlings after the first air pruning step into containers having a depth of 3 to 5½ inches for a second root air pruning step, wherein the second air root pruning occurs at a root depth of 3 to 5½ inches.

18. The method according to claim 16, wherein air root pruning of the seedlings' roots is performed by the growing medium being in one or more containers having an open bottom, the one or more containers adapted to be set on a mesh support.

19. The method according to claim 16, wherein air pruning of the seedlings' roots comprises growing the seedlings in bottomless flats supported at a height of between 24 inches and 36 inches above the ground.

20. The growing medium according to claim 16, further comprising slow release fertilizers, micronutrients and a wetting agent.

* * * * *